United States Patent
Edge et al.

(10) Patent No.: US 12,047,844 B2
(45) Date of Patent: Jul. 23, 2024

(54) METHODS AND SYSTEMS FOR ON-DEMAND TRANSMISSION OF A POSITIONING REFERENCE SIGNAL IN A WIRELESS NETWORK

(71) Applicant: QUALCOMM Incorporated, San Diego, CA (US)

(72) Inventors: Stephen William Edge, Escondido, CA (US); Sven Fischer, Nuremberg (DE); Sony Akkarakaran, Poway, CA (US); Guttorm Ringstad Opshaug, Redwood City, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/822,063

(22) Filed: Aug. 24, 2022

(65) Prior Publication Data

US 2022/0408220 A1    Dec. 22, 2022

Related U.S. Application Data

(63) Continuation of application No. 16/668,582, filed on Oct. 30, 2019, now Pat. No. 11,451,926.

(Continued)

(51) Int. Cl.
*H04W 4/029* (2018.01)
*H04L 5/00* (2006.01)
*H04W 16/28* (2009.01)

(52) U.S. Cl.
CPC .......... *H04W 4/029* (2018.02); *H04L 5/0048* (2013.01); *H04W 16/28* (2013.01)

(58) Field of Classification Search
CPC ....... H04W 16/28; H04W 64/00; H04W 4/02; H04W 40/244; H04W 4/029;

(Continued)

(56) References Cited

U.S. PATENT DOCUMENTS 8,369,257 B2    2/2013 Chu et al.
8,391,259 B2    3/2013 Chu et al.
(Continued)

FOREIGN PATENT DOCUMENTS

BR    112018075006 A2    3/2019
CA         3024319 A1    12/2017
(Continued)

OTHER PUBLICATIONS

"3rd Generation Partnership Project, Technical Specification Group Radio Access Network, NG-RAN, Architecture Description (Release 15)", 3GPP Draft, Draft 38401-F40, 3rd Generation Partnership Project (3GPP), Mobile Competence Centre, 650, Route Des Lucioles, F-06921 Sophia-Antipolis Cedex, France, Jan. 3, 2019 (Jan. 3, 2019), XP051576896, 40 pages, Retrieved from the Internet: URL: http://www.3gpp.org/ftp/tsg%5Fran/WG3%5Flu/Draft%5FSpecs/TSG%2DRAN82/Draft%5F38401%2Df40%2Ezip. [retrieved on Jan. 3, 2019] p. 7, section 3.1.

(Continued)

*Primary Examiner* — Quoc Thai N Vu
(74) *Attorney, Agent, or Firm* — QUALCOMM Incorporated

(57) ABSTRACT

An entity in a wireless network is configured to increase transmission of a positioning reference signal (PRS) at each of a plurality of transmitters, where the increase in transmission of PRS at each of the plurality of transmitters is coordinated to avoid interference to or from non-PRS transmission in the wireless network. The increase in the transmission of PRS may be performed by a server, such as a location management function (LMF) or location management component (LMC), a base station, such as a gNB, ng-eNB, or eNB, or by a combination of the server and base station. The entity may determine the increase in transmission of the PRS in response to location requests for a (Continued)

plurality of user equipments (UEs), notification reports from a plurality of base stations, or requests for increased PRS from a plurality of UEs.

30 Claims, 14 Drawing Sheets

Related U.S. Application Data

(60) Provisional application No. 62/805,945, filed on Feb. 14, 2019, provisional application No. 62/754,569, filed on Nov. 1, 2018, provisional application No. 62/753,900, filed on Oct. 31, 2018.

(58) Field of Classification Search
CPC ............... H04W 64/003; H04W 88/18; H04L 5/0048; H04L 5/005; G01S 5/0236; G01S 5/0045; G01S 5/0009
See application file for complete search history.

(56) References Cited

U.S. PATENT DOCUMENTS

| | | | |
|---|---|---|---|
| 8,526,391 B2 | 9/2013 | Issakov et al. | |
| 8,625,570 B2 | 1/2014 | Chu et al. | |
| 9,078,145 B2 | 7/2015 | Issakov et al. | |
| 9,538,525 B2 | 1/2017 | Chu et al. | |
| 9,775,121 B1 | 9/2017 | Cai et al. | |
| 10,111,167 B2 | 10/2018 | Zhou et al. | |
| 10,366,064 B2 | 7/2019 | Cariou et al. | |
| 10,397,928 B1 | 8/2019 | Hahn et al. | |
| 10,433,345 B2 | 10/2019 | Kim et al. | |
| 10,470,128 B2 | 11/2019 | Noh et al. | |
| 10,674,513 B2 | 6/2020 | Hahn et al. | |
| 10,735,159 B2 | 8/2020 | Shao et al. | |
| 10,764,925 B2 | 9/2020 | Li et al. | |
| 10,785,795 B2 | 9/2020 | Son et al. | |
| 10,841,961 B2 | 11/2020 | Kim et al. | |
| 10,873,973 B2 | 12/2020 | Ko et al. | |
| 11,134,361 B2 | 9/2021 | Fischer | |
| 2008/0009243 A1 | 1/2008 | Hart | |
| 2009/0213776 A1 | 8/2009 | Chu et al. | |
| 2010/0165907 A1 | 7/2010 | Chu et al. | |
| 2010/0165963 A1 | 7/2010 | Chu et al. | |
| 2010/0331009 A1 | 12/2010 | Krishnamurthy et al. | |
| 2011/0081933 A1 | 4/2011 | Suh et al. | |
| 2012/0115532 A1 | 5/2012 | He et al. | |
| 2012/0129551 A1 | 5/2012 | Islam | |
| 2012/0258733 A1 | 10/2012 | Fischer et al. | |
| 2012/0302254 A1 | 11/2012 | Charbit et al. | |
| 2013/0053077 A1 | 2/2013 | Barbieri et al. | |
| 2014/0016621 A1 | 1/2014 | Zhang et al. | |
| 2014/0119268 A1 | 5/2014 | Chu et al. | |
| 2014/0274160 A1 | 9/2014 | Xiao et al. | |
| 2015/0009845 A1 | 1/2015 | Takano | |
| 2015/0133081 A1 | 5/2015 | Griot et al. | |
| 2015/0223185 A1* | 8/2015 | Harris ............... H04W 52/0206 | |
| | | | 455/456.5 |
| 2015/0282133 A1 | 10/2015 | Kakishima et al. | |
| 2015/0296359 A1 | 10/2015 | Edge | |
| 2015/0304868 A1 | 10/2015 | Yu et al. | |
| 2015/0365790 A1 | 12/2015 | Edge et al. | |
| 2016/0081033 A1 | 3/2016 | Ouchi et al. | |
| 2016/0150432 A1 | 5/2016 | Qin | |
| 2016/0205499 A1 | 7/2016 | Davydov et al. | |
| 2016/0227373 A1 | 8/2016 | Tsai et al. | |
| 2016/0345258 A1 | 11/2016 | Zhou et al. | |
| 2017/0033916 A1 | 2/2017 | Stirling-Gallacher et al. | |
| 2017/0142659 A1 | 5/2017 | Noh et al. | |
| 2017/0201926 A1 | 7/2017 | Krendzel et al. | |
| 2017/0230149 A1 | 8/2017 | Wang et al. | |
| 2017/0255659 A1 | 9/2017 | Cariou et al. | |
| 2017/0359300 A1 | 12/2017 | Patil et al. | |
| 2018/0054818 A1 | 2/2018 | Kakani et al. | |
| 2018/0098314 A1 | 4/2018 | Rico Alvarino et al. | |
| 2018/0098378 A1 | 4/2018 | Patil et al. | |
| 2018/0110046 A1 | 4/2018 | Patil et al. | |
| 2018/0123625 A1 | 5/2018 | Lee et al. | |
| 2018/0184285 A1 | 6/2018 | Patil et al. | |
| 2018/0206063 A1* | 7/2018 | Frenger ................. H04W 4/025 |
| 2018/0235002 A1 | 8/2018 | Son et al. | |
| 2018/0262252 A1 | 9/2018 | Oh et al. | |
| 2018/0270038 A1 | 9/2018 | Oteri et al. | |
| 2018/0343677 A1 | 11/2018 | Li et al. | |
| 2018/0359779 A1 | 12/2018 | Kim et al. | |
| 2019/0014561 A1 | 1/2019 | Takeda et al. | |
| 2019/0021091 A1 | 1/2019 | Ko et al. | |
| 2019/0037338 A1 | 1/2019 | Edge et al. | |
| 2019/0082387 A1 | 3/2019 | Kim et al. | |
| 2019/0090092 A1 | 3/2019 | Hwang et al. | |
| 2019/0132872 A1 | 5/2019 | Ko et al. | |
| 2019/0141694 A1 | 5/2019 | Gupta et al. | |
| 2019/0373634 A1 | 12/2019 | Kim et al. | |
| 2019/0380056 A1 | 12/2019 | Lee et al. | |
| 2020/0045637 A1 | 2/2020 | Noh et al. | |
| 2020/0052832 A1 | 2/2020 | Tian et al. | |
| 2020/0059932 A1 | 2/2020 | Hahn et al. | |
| 2020/0092737 A1 | 3/2020 | Siomina et al. | |
| 2020/0137674 A1 | 4/2020 | Aio et al. | |
| 2020/0137715 A1 | 4/2020 | Edge et al. | |
| 2020/0154240 A1 | 5/2020 | Edge et al. | |
| 2020/0221545 A1 | 7/2020 | Stacey et al. | |
| 2020/0236134 A1 | 7/2020 | Bhanage et al. | |
| 2020/0267508 A1 | 8/2020 | Fischer | |
| 2020/0280399 A1 | 9/2020 | Kim et al. | |
| 2020/0288323 A1 | 9/2020 | Silverman et al. | |
| 2020/0367280 A1 | 11/2020 | Son et al. | |
| 2020/0367281 A1 | 11/2020 | Son et al. | |
| 2020/0413445 A1 | 12/2020 | Seok et al. | |
| 2020/0413446 A1 | 12/2020 | Seok et al. | |
| 2021/0006360 A1 | 1/2021 | Asterjadhi et al. | |
| 2021/0006361 A1 | 1/2021 | Asterjadhi et al. | |
| 2021/0014692 A1 | 1/2021 | Cherian et al. | |
| 2021/0014900 A1 | 1/2021 | Lei et al. | |
| 2021/0099253 A1 | 4/2021 | Kim et al. | |
| 2021/0099256 A1 | 4/2021 | Lee et al. | |
| 2021/0119698 A1 | 4/2021 | Atungsiri et al. | |
| 2021/0135792 A1 | 5/2021 | Cho et al. | |
| 2021/0144612 A1 | 5/2021 | Wei et al. | |
| 2021/0218516 A1 | 7/2021 | Chen et al. | |
| 2021/0219254 A1 | 7/2021 | Wang et al. | |
| 2021/0328747 A1 | 10/2021 | Da et al. | |
| 2021/0341562 A1 | 11/2021 | Ernstrom et al. | |
| 2022/0386184 A1 | 12/2022 | Li et al. | |

FOREIGN PATENT DOCUMENTS

| | | |
|---|---|---|
| CN | 105992339 A | 10/2016 |
| CN | 106031206 A | 10/2016 |
| EP | 3243292 A1 | 11/2017 |
| EP | 3451744 A2 | 3/2019 |
| EP | 3451745 A1 | 3/2019 |
| EP | 3451745 A4 | 9/2019 |
| EP | 3451744 A4 | 12/2019 |
| EP | 3243292 B1 | 3/2020 |
| EP | 3687101 A1 | 7/2020 |
| JP | 2009074974 A | 4/2009 |
| JP | 2009528546 A | 8/2009 |
| JP | 2013511233 A | 3/2013 |
| JP | 6599994 B2 | 10/2019 |
| KR | 20180100064 A | 9/2018 |
| KR | 101962150 B1 | 3/2019 |
| WO | 2012012561 A1 | 1/2012 |
| WO | 2013029000 A1 | 2/2013 |
| WO | 2015192113 A1 | 12/2015 |
| WO | WO-2015180119 A1 | 12/2015 |
| WO | 2016112306 A1 | 7/2016 |
| WO | 2017043867 A1 | 3/2017 |
| WO | 2017172068 A1 | 10/2017 |
| WO | 2017188712 A2 | 11/2017 |
| WO | 2017188713 A1 | 11/2017 |
| WO | 2017196510 | 11/2017 |
| WO | 2017218556 A1 | 12/2017 |

(56) References Cited

FOREIGN PATENT DOCUMENTS

| WO | 2018028941 | A1 | 2/2018 |
|---|---|---|---|
| WO | 2018075226 | A1 | 4/2018 |
| WO | 2018128452 | A1 | 7/2018 |
| WO | 2017188712 | A3 | 8/2018 |
| WO | 2018159967 | A1 | 9/2018 |
| WO | 2019027540 | | 2/2019 |
| WO | 2019182421 | A1 | 9/2019 |
| WO | 2020073644 | A1 | 4/2020 |
| WO | 2020097441 | A1 | 5/2020 |

OTHER PUBLICATIONS

Asterjadhi A., et al., "Identifiers in HE PPDUs for Power Saving", IEEE, Sep. 12, 2015, 18 pages, IEEE P802.11—Task Group AX, doc.: IEEE 802.11-15/1122r0 (Year: 2015).
European Search Report—EP21214064—Search Authority—Munich—dated Apr. 4, 2022.
Inoue Y., et al., "Number of BSS Color Bits", IEEE, Sep. 14, 2015, 20 pages, IEEE P802.11—Task Group AX, doc.: IEEE 802.11-15/1075r1 (Year: 2015).
International Search Report and Written Opinion—PCT/US2020/018261—ISA/EPO—dated May 15, 2020.
International Preliminary Report on Patentability—PCT/US2019/059076, The International Bureau of WIPO—Geneva, Switzerland, dated May 14, 2021.
International Preliminary Report on Patentability—PCT/US2019/059077, The International Bureau of WIPO—Geneva, Switzerland, dated May 14, 2021.
International Search Report and Written Opinion—PCT/US2019/059076—ISA/EPO—dated Apr. 17, 2020.
International Search Report and Written Opinion—PCT/US2019/059077—ISA/EPO—dated Apr. 21, 2020.
Khorov E., et al., "Multiple NAVs for Spatial Reuse", IEEE, Nov. 9, 2015, 11 pages, IEEE P802.11—Task Group AX, doc.: IEEE 802.11-15/1348 (Year: 2015).
Ko G., et al., "BSS Color Settings for a Multiple BSSID Set", IEEE, Jan. 18, 2016, 11 pages, IEEE P802.11—Task Group AX, doc.: IEEE 802 .11-16/0042r0 (Year: 2016).
QUALCOMM Incorporated: "Local NR Positioning in NG-RAN", 3GPP Draft, 3GPP TSG-RAN WG3 Meeting #105, R3-193586 (Local LMF), 3rd Generation Partnership Project (3GPP), Mobile Competence Centre, 650, Route Des Lucioles, F-06921 Sophia-Antipolis Cedex, France, vol. RAN WG3, No. Ljubljana, Slovenia, Aug. 26, 2019-Aug. 30, 2019, Aug. 16, 2019 (Aug. 16, 2019), XP051769793, 32 pages, Retrieved from the Internet: URL: http://www.3gpp.org/ftp/tsg_ran/WG3_lu/TSGR3_105/Docs/R3-193586.zip. [retrieved on Aug. 16, 2019] the whole document.
QUALCOMM Incorporated: "NG-RAN Positioning Architecture and Procedures", 3GPP Draft, 3GPP TSG-RAN WG2 Meeting #105, R2-1901370, (NG-RAN Positioning Architecture), 3rd Generation Partnership Project (3GPP); Mobile Competence Centre, 650, Route Des Lucioles, F-06921 Sophia-Antipolis Cedex, France, vol. RAN WG2, No. Athens, Greece, Feb. 25, 2019-Mar. 1, 2019, Feb. 15, 2019 (Feb. 15, 2019), XP051602729, 10 pages, Retrieved from the Internet: URL: http://www.3gpp.org/ftp/tsg%5Fran/WG2%5FRL2/TSGR2%5F105/Docs/R2%2D1901370%2Ezip.
Qualcom Incorporated: "NG-RAN Positioning Architecture and Procedures", 3GPP draft, 3GPP TSF-RAN WG2 Metting #104, R2-1817899. Retreived from internet address https://www.3gpp.org/ftp/TSG_RAN/WG2_RL2/TSGR2_104/Docs/RZ-1817899.zip.
Qualcomm Incorporated: "Combined Downlink and Uplink NR Positioning Procedures", 3GPP draft, 3GPP TSF-RAN WG2 Metting #104, R2-1817898. Retreived from internet address https://www.3gpp.org/ftp/TSG_RAN/WG2_RL2/TSGR2_104/Docs/R2-1817898.zip.
QUALCOMM Incorporated: "On Demand Transmission of PRS for NR," 3GPP Draft, 3GPP TSG-RAN WG2 Meeting #104, R2-1817902_ (On Demand Prs), 3rd Generation Partnership Project, Mobile Competence Centre, 650, Route Des Lucioles, F-06921, Sophia-Antipolis Cedex, France, vol. RAN WG2. No. Spokane. USA, Nov. 12, 2018-Nov. 16, 2018, Nov. 12, 2018, XP051557415, 27 pages.
Stacey R: "Specification Framework for TGax", Dec. 7, 2015, IEEE, IEEE P802.11—Task Group AX, doc.: IEEE 802.11-15/0132r13 (Year: 2015), pp. 1-38.
Trueposition: "UTDOA Architecture Options", 3GPP Draft, 3GPP TSG RAN WG2 Meeting #74, R2-112792, UTDOA Architecture, 3rd Generation Partnership Project (3GPP), Mobile Competence Centre, 650, Route Des Lucioles, F-06921 Sophia-Antipolis Cedex, France, vol. RAN WG2, No. Barcelona, Spain, May 9, 2011, May 3, 2011 (May 3, 2011), XP050495236, 9 pages, [Retrieved on May 3, 2011] The Whole Document.
Wang X., et al., "CR for BSS Color Related CIDs Part 2", IEEE, Nov. 8, 2019, 5 pages, IEEE P802.11—Task Group AX, CR for CID 4060 and 4122CR for CID 4060 and 41221977r0 (Year: 2019).
3GPP TS 38.401: "3rd Generation Partnership Project, Technical Specification Group Radio Access Network, NG-RAN, Architecture description (Release 15)", 3GPP, Mobile Competence Centre, 650, Route Des Lucioles, F-06921 Sophia-Antipolis Cedex, France, vol. RAN WG3, No. V15.4.0 (Dec. 2018), Jan. 8, 2019, pp. 1-40, XP051591620, para. [6.1.1], [6.1.2] para. [08.1]-para. [8.2.2.2] para. [8.6.1]-para. [08.7] para. [8.9.4] para. [8.9.6.1], [8.9.6.2].
QUALCOMM Incorporated: "Considerations on NR Positioning Using PRS", 3GPP Draft, R1-1811287, 3GPP TSG-RAN WG1 Meeting #94bis, (OTDOA-RTT-PRS), 3rd Generation Partnership Project (3GPP), Mobile Competence Centre, 650, Route Des Lucioles; F-06921 Sophia-Antipolis Cedex, France, vol. RAN WG1, No. Chengdu, CN; Oct. 8, 2018-Oct. 12, 2018, Sep. 29, 2018 (Sep. 29, 2018), XP051518690, 8 Pages, chapters 2. 3.3. 3.5. 3.6. 4.
European Search Report—EP23199506—Search Authority—MUNICH—Jan. 8, 2024.

\* cited by examiner

METHODS AND SYSTEMS FOR ON-DEMAND TRANSMISSION OF A POSITIONING REFERENCE SIGNAL IN A WIRELESS NETWORK

CROSS-REFERENCE TO RELATED APPLICATIONS

This application is a continuation of U.S. application Ser. No. 16/668,582, entitled "METHODS AND SYSTEMS FOR ON-DEMAND TRANSMISSION OF A POSITIONING REFERENCE SIGNAL IN A WIRELESS NETWORK," filed Oct. 30, 2019, which claims the benefit of U.S. Provisional Application Nos. 62/753,900, entitled "METHODS AND SYSTEMS FOR ON-DEMAND TRANSMISSION OF A POSITIONING REFERENCE SIGNAL IN A WIRELESS NETWORK," filed Oct. 31, 2018, and 62/754,569, entitled "METHODS AND SYSTEMS FOR ON-DEMAND TRANSMISSION OF A POSITIONING REFERENCE SIGNAL IN A WIRELESS NETWORK," filed Nov. 1, 2018, and 62/805,945, entitled "ARCHITECTURE FOR SUPPORT OF HIGH-PERFORMANCE LOCATION SERVICES IN A NEXT GENERATION RADIO ACCESS NETWORK," filed Feb. 14, 2019. Each of the applications listed in this paragraph are assigned to the assignee thereof and are expressly incorporated herein by reference in their entireties.

BACKGROUND

Obtaining the location of a mobile device that is accessing a wireless network may be useful for many applications including, for example, emergency calls, personal navigation, asset tracking, locating a friend or family member, etc. However, location of a mobile device can require usage of resources by a network for transmitting a downlink positioning reference signal (PRS) from network base stations and/or other transmission points that can be measured by a mobile device to obtain location measurements. When no mobile devices need to obtain location measurements of a PRS, the transmission of these signals by the wireless network may waste power and/or may waste signaling resources which could be better used for other purposes such as sending and receiving voice and data. It may therefore be advantageous to use methods that enable PRS transmission to be responsive to whether or not PRS measurement by mobile devices is needed.

SUMMARY

Techniques described herein are directed to increasing a transmission of a positioning reference signal (PRS) at each of a plurality of transmitters, wherein the increase in transmission of PRS at each of the plurality of transmitters is coordinated to avoid interference to or from non-PRS transmission in the wireless network. The increase in the transmission of PRS may be performed by a server, such as a location management function (LMF), a base station, such as a gNB, ng-eNB, or eNB, or by a combination of the server and base station. The increase in transmission of the PRS may be in response to location requests for a plurality of user equipments (UEs), notification reports from a plurality of base stations, or requests for increased PRS from a plurality of UEs.

In one aspect, a method for supporting location of a user equipment (UE) at a first entity in a wireless network includes determining an increase in transmission of a positioning reference signal (PRS) at each of a plurality of transmitters, wherein the increase in transmission of PRS at each of the plurality of transmitters is coordinated to avoid interference to or from non-PRS transmission in the wireless network; sending a first message to the each transmitter, the first message comprising an indication of the increase in transmission of PRS for the each transmitter; and receiving a response from the each transmitter, the response confirming or rejecting the increase in transmission of PRS at the each transmitter.

In one aspect, an entity in a wireless network configured for supporting location of a user equipment (UE) includes an external interface configured to receive and send messages to other entities in the wireless network; at least one memory; and at least one processor coupled to the external interface and the at least one memory, the at least one processor configured to: determine an increase in transmission of a positioning reference signal (PRS) at each of a plurality of transmitters, wherein the increase in transmission of PRS at each of the plurality of transmitters is coordinated to avoid interference to or from non-PRS transmission in the wireless network; send, via the external interface, a first message to the each transmitter, the first message comprising an indication of the increase in transmission of PRS for the each transmitter; and receive, via the external interface, a response from the each transmitter, the response confirming or rejecting the increase in transmission of PRS at the each transmitter.

In one aspect, an entity in a wireless network configured for supporting location of a user equipment (UE) includes means for determining an increase in transmission of a positioning reference signal (PRS) at each of a plurality of transmitters, wherein the increase in transmission of PRS at each of the plurality of transmitters is coordinated to avoid interference to or from non-PRS transmission in the wireless network; means for sending a first message to the each transmitter, the first message comprising an indication of the increase in transmission of PRS for the each transmitter; and means for receiving a response from the each transmitter, the response confirming or rejecting the increase in transmission of PRS at the each transmitter.

In one aspect, a non-transitory computer readable medium including program code stored thereon, the program code is operable to configure at least one processor in a first entity in a wireless network for supporting location of a user equipment (UE), includes program code to determine an increase in transmission of a positioning reference signal (PRS) at each of a plurality of transmitters, wherein the increase in transmission of PRS at each of the plurality of transmitters is coordinated to avoid interference to or from non-PRS transmission in the wireless network; program code to send a first message to the each transmitter, the first message comprising an indication of the increase in transmission of PRS for the each transmitter; and program code to receive a response from the each transmitter, the response confirming or rejecting the increase in transmission of PRS at the each transmitter.

Figure 1A:
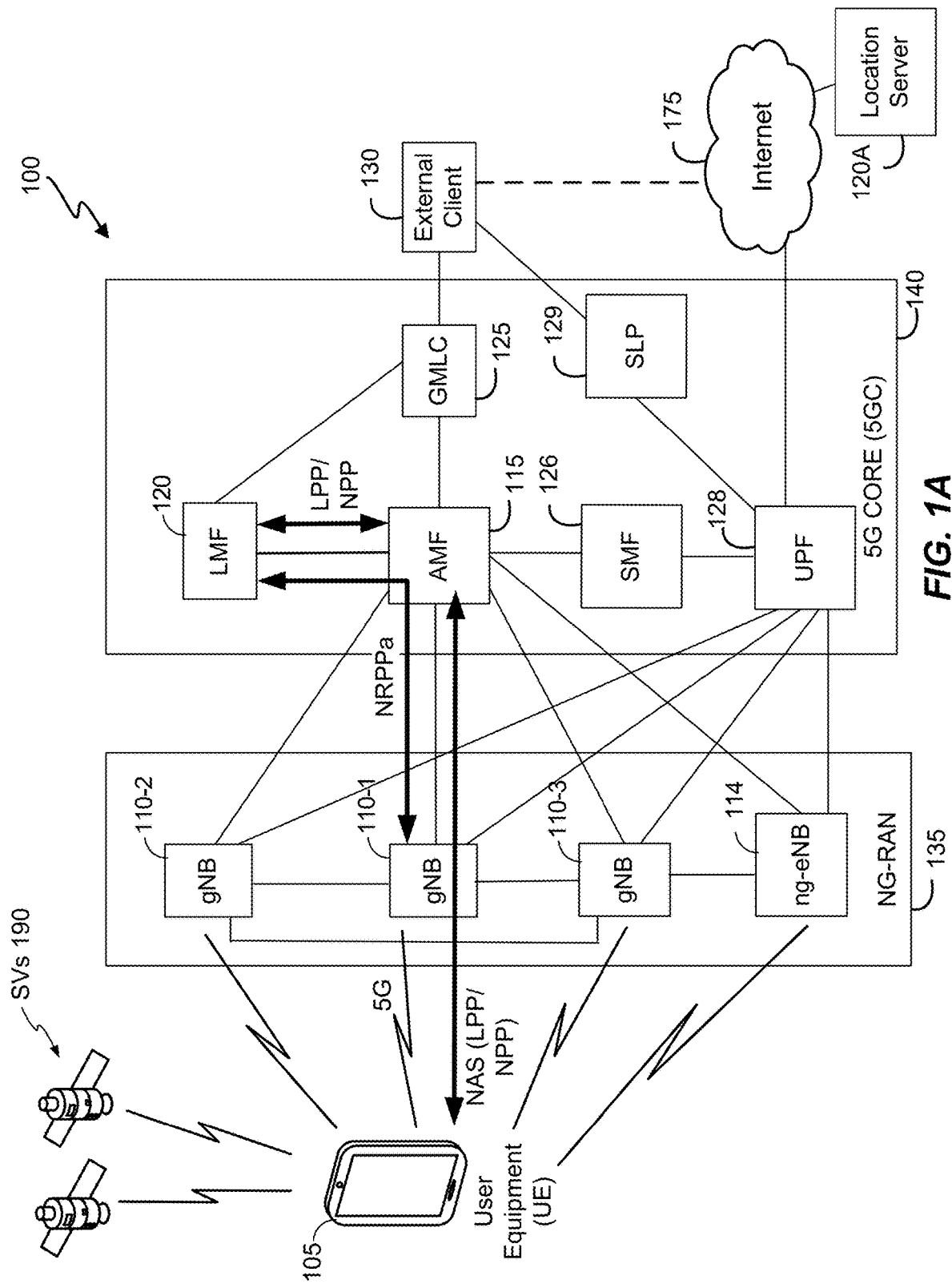
FIG. 1A is a diagram of an example communication system that may utilize a 5G network to determine a position for a mobile device, according to an embodiment.

Like reference symbols in the various drawings indicate like elements, in accordance with certain example implementations. In addition, multiple instances of an element may be indicated by following a first number for the element with a letter or a hyphen and a second number. For example, multiple instances of an element 110 may be indicated as 110-1, 110-2, 110-3 etc. When referring to such an element using only the first number, any instance of the element is to be understood (e.g. element 110 in the previous example would refer to elements 110-1, 110-2 and 110-3).

DETAILED DESCRIPTION

Obtaining the location of a mobile device that is accessing a wireless network may be useful for many applications including, for example, emergency calls, personal navigation, asset tracking, locating a friend or family member, etc. However, location of a mobile device can require usage of resources by a network for transmitting a downlink positioning reference signal (PRS) from network base stations and/or other transmission points (TPs) that can be measured by a mobile device to obtain location measurements. When no mobile devices need to obtain location measurements of PRSs, the transmission of these signals by the wireless network may waste power and/or may waste signaling resources which could be better used for other purposes such as sending and receiving voice and data. It may therefore be advantageous to use methods that enable PRS transmission to be responsive to whether or not PRS measurement by mobile devices is needed and to reduce or stop transmission of PRS when location measurements by mobile devices are not needed.

As an example of resource usage for PRS in a wireless network, base stations in the wireless network may transmit a PRS continuously in each cell to support, for example, observed time difference of arrival (OTDOA) location determination (e.g., for LTE or 5G access) which may consume significant operator bandwidth. For example, if only used for location of emergency calls, the PRS of any cell may only be measured for a small proportion of transmission time (e.g. 1% or less) if emergency calls occur infrequently within or nearby to any cell. Even when used for other applications (e.g., location of "Internet of Things" (IoT) devices), PRS transmission may not be needed for location for a significant proportion of time. However, reducing the amount of PRS transmission (e.g. the bandwidth or periodicity of PRS) to conserve network resources may result in reduced location accuracy and/or higher latency when location of a mobile device is needed.

To support 5G New Radio (NR), System Information (SI) messages, carrying network related information needed for normal operation or location support for UEs, can be broadcast periodically as indicated by scheduling information in an SI Block 1 (SIB1) or some other SIB, or can be indicated in SIB1 (or in another SIB) as currently not being broadcast. In the latter case, a user equipment (UE) can request the broadcast of one or more SI messages (or one or more SIBs) using a random access procedure or a Radio Resource Control (RRC) Common Control Channel (CCCH) request when not in a connected state (e.g. when in an idle state). A similar capability could be useful for broadcast or transmission of a DL Positioning Reference Signal (PRS) for 5G NR (e.g. to support position methods such as OTDOA, Enhanced Cell ID (ECID), angle of arrival (AOA) or angle of departure (AOD). The capability could allow a UE or another entity which is aware of UE positioning requirements (e.g. a Location Management Function (LMF)) to request an increase in resources assigned for Downlink (DL) PRS transmission (e.g. increased bandwidth, increased duration of positioning occasions and/or increased frequency of positioning occasions) and possibly to indicate when increased DL PRS transmission is no longer needed. The benefits of this can include reduced network bandwidth usage for DL PRS when no UEs need to acquire and measure PRS in a particular cell or group of cells and improved positioning accuracy and/or latency when one or more UEs do need to acquire and measure PRS to obtain location measurements.

Increased DL PRS transmission could be simplified by restricting PRS transmission by a base station (e.g. gNB) or in a cell to only certain PRS configurations, which might be configured in a gNB and/or in an LMF using Operations and Maintenance (O&M). For example, there might be a set of PRS configuration parameters (e.g. defining a bandwidth, RF frequency, periodicity and duration of a PRS) used for "normal" PRS transmission in the absence of any request for increased PRS transmission. In some networks, the "normal" PRS transmission might equate to no PRS transmission at all (to minimize resource usage). There could then be one or more levels of increased PRS transmission, each defined by a different set of PRS configuration parameters such as parameters defining increased PRS bandwidth, a greater range of PRS frequencies, longer duration of PRS positioning occasions and/or shorter periodicity of PRS positioning occasions. The association of increased PRS transmission with only certain sets of pre-defined PRS configuration parameters could simplify the control and transmission of increased PRS. For example, in the simplest case, PRS transmission might just be turned on when needed, according to a single default set of PRS configuration parameters, and turned off when not needed.

Described herein are systems, devices, methods, media and other implementations for on-demand PRS resource allocation for 4G, 5G, and/or other types of communication technologies. These enable LMF control, gNB control and combined gNB-LMF control (also referred to as enhanced LMF control) of DL PRS transmission. The on-demand PRS transmission may permit resources to be allocated for PRS transmission only, or mainly, when a UE needs to be located using PRS transmission and not at other times when no UE needs to be located using PRS transmission. For example, in order to avoid wastage of operator bandwidth when PRS-based location is not needed, and to enable more PRS resources to become available when PRS-based location of a UE is needed, on-demand transmission (also referred to as scheduling) of PRS may be supported. With on-demand PRS transmission, UEs or other elements in a network may indicate to a controlling entity (e.g. a gNB or LMF) when downlink (DL) PRS transmission is needed for location determination. The controlling entity can then coordinate an increase in resource allocation for DL PRS transmission by increasing the overall duration during which DL PRS is transmitted (e.g. by increasing the number of subframes in each PRS positioning occasion and/or increasing the frequency of PRS positioning occasions) and/or by increasing the proportion of overall carrier bandwidth assigned to each (or all) DL PRS transmission. While increasing PRS transmission duration may disturb other traffic in some scenarios (e.g. by interfering with other pre-allocated downlink channels like SIBs), increasing PRS bandwidth may interfere less and may improve both measurement accuracy and acquisition of distant base stations. A network, or certain base stations in a network, may also increase the resource allocation for PRS transmission by temporarily reallocating frequency, normally reserved for uplink transmission from UEs, for downlink transmission of PRS during certain specific periods (e.g. during certain subframes). For example, this may be possible using a flexible duplexing capability for 5G New Radio (NR).

It is noted that references to PRS and PRS transmission herein refer to DL PRS or DL PRS transmission, respectively, unless otherwise qualified. However, the techniques described herein to support on demand transmission of DL PRS may be applicable, in part, to transmission of PRS on a sidelink (e.g. UE to UE) or in an uplink (e.g. UE to gNB).

While transmission of a PRS to support location of mobile devices is described herein, transmission of other types of signal such as a Cell-specific Reference Signal (CRS) or Tracking Reference Signal (TRS) may be used instead for some wireless technologies (e.g. such as 5G NR). Consequently, methods exemplified herein to support increased resource allocation for PRS transmission may be equally applicable to transmission of other signals used for positioning such as a CRS or TRS. It is noted that the term PRS "transmission" as used here can include PRS broadcast to all UEs able to receive the PRS, PRS multicast to selected UEs (e.g. UEs with a subscription to receive PRS where the PRS may use a coding scheme known only to the subscribed UEs) and PRS unicast to just one UE.

FIG. 1A shows a diagram of a communication system 100, according to an embodiment. The communication system 100 may be configured to implement on-demand resource allocation for PRS transmission as described herein. Here, the communication system 100 comprises a UE 105, and components of a Fifth Generation (5G) network comprising a Next Generation (NG) Radio Access Network (RAN) (NG-RAN) 135 and a 5G Core Network (5GC) 140. A 5G network may also be referred to as a New Radio (NR) network; NG-RAN 135 may be referred to as a 5G RAN or as an NR RAN; and 5GC 140 may be referred to as an NG Core network (NGC). The communication system 100 may further utilize information from satellite vehicles (SVs) 190 for a Global Navigation Satellite System (GNSS) like GPS, GLONASS, Galileo or Beidou or some other local or regional Satellite Positioning System (SPS) such as IRNSS, EGNOS or WAAS. Additional components of the communication system 100 are described below. The communication system 100 may include additional or alternative components.

It should be noted that FIG. 1A provides only a generalized illustration of various components, any or all of which may be utilized as appropriate, and each of which may be duplicated or omitted as necessary. Specifically, although only one UE 105 is illustrated, it will be understood that many UEs (e.g., hundreds, thousands, millions, etc.) may utilize the communication system 100. Similarly, the communication system 100 may include a larger (or smaller) number of SVs 190, gNBs 110, ng-eNBs 114, AMFs 115, external clients 130, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1A illustrates a 5G-based network, similar network implementations and configurations may be used for other communication technologies, such as 3G, Long Term Evolution (LTE), etc. Implementations described herein (be they for 5G technology or for other communication technologies and protocols) may be used to configure, in response to receiving a request, an increased quantity of location-related information or resources associated with broadcast communication from wireless nodes, e.g., transmission of PRS signals or some other location related function of the wireless nodes.

The UE 105 may comprise and/or be referred to as a device, a mobile device, a wireless device, a mobile terminal, a terminal, a mobile station (MS), a Secure User Plane Location (SUPL) Enabled Terminal (SET), or by some other name. Moreover, UE 105 may correspond to a cellphone, smartphone, laptop, tablet, PDA, tracking device, navigation device, Internet of Things (IoT) device, or some other portable or moveable device. Typically, though not necessarily, the UE 105 may support wireless communication using one or more Radio Access Technologies (RATs) such as using Global System for Mobile communication (GSM), Code Division Multiple Access (CDMA), Wideband CDMA (WCDMA), LTE, High Rate Packet Data (HRPD), IEEE 802.11 WiFi (also referred to as Wi-Fi), Bluetooth® (BT), Worldwide Interoperability for Microwave Access (WiMAX), 5G New Radio (NR) (e.g., using the NG-RAN 135 and 5GC 140), etc. The UE 105 may also support wireless communication using a Wireless Local Area Network (WLAN) which may connect to other networks (e.g. the Internet) using a Digital Subscriber Line (DSL) or packet cable for example. The use of one or more of these RATs may allow the UE 105 to communicate with an external client 130 (via elements of 5GC 140 not shown in FIG. 1A, or possibly via a Gateway Mobile Location Center (GMLC) 125) and/or allow the external client 130 to receive location information regarding the UE 105 (e.g., via the GMLC 125).

The UE 105 may include a single entity or may include multiple entities such as in a personal area network where a user may employ audio, video and/or data I/O devices and/or body sensors and a separate wireline or wireless modem. An estimate of a location of the UE 105 may be referred to as a location, location estimate, location fix, fix, position, position estimate or position fix, and may be geographic, thus providing location coordinates for the UE 105 (e.g., latitude and longitude) which may or may not include an altitude component (e.g., height above sea level, height above or depth below ground level, floor level or basement level). Alternatively, a location of the UE 105 may be expressed as a civic location (e.g., as a postal address or the designation of some point or small area in a building such as a particular room or floor). A location of the UE 105 may also be expressed as an area or volume (defined either geographically or in civic form) within which the UE 105 is expected to be located with some probability or confidence level (e.g., 67%, 95%, etc.) A location of the UE 105 may further be a relative location comprising, for example, a distance and direction or relative X, Y (and Z) coordinates defined relative to some origin at a known location which may be defined geographically, in civic terms, or by reference to a point, area, or volume indicated on a map, floor plan or building plan. In the description contained herein, the use of the term location may comprise any of these variants unless indicated otherwise. When computing the location of a UE, it is common to solve for local x, y, and possibly z coordinates and then, if needed, convert the local coordinates into absolute ones (e.g. for latitude, longitude and altitude above or below mean sea level).

Base stations (BSs) in the NG-RAN 135 shown in FIG. 1A comprise NR NodeBs, also referred to as gNBs, 110-1, 110-2 and 110-3 (collectively and generically referred to herein as gNBs 110). Pairs of gNBs 110 in NG-RAN 135 may be connected to one another—e.g. directly as shown in FIG. 1A or indirectly via other gNBs 110. Access to the 5G network is provided to UE 105 via wireless communication between the UE 105 and one or more of the gNBs 110, which may provide wireless communications access to the 5GC 140 on behalf of the UE 105 using 5G NR as defined by the Third Generation Partnership Project (3GPP). 5G NR radio access may also be referred to as NR radio access or as 5G radio access. In FIG. 1A, the serving gNB for UE 105 is assumed to be gNB 110-1, although other gNBs (e.g. gNB 110-2 and/or gNB 110-3) may act as a serving gNB if UE 105 moves to another location or may act as a secondary gNB to provide additional throughout and bandwidth to UE 105.

Base stations (BSs) in the NG-RAN 135 shown in FIG. 1A may also or instead include a next generation evolved Node B, also referred to as an ng-eNB, 114. Ng-eNB 114 may be connected to one or more gNBs 110 in NG-RAN 135—e.g. directly or indirectly via other gNBs 110 and/or other ng-eNBs. An ng-eNB 114 may provide LTE wireless access and/or evolved LTE (eLTE) wireless access to UE 105, as defined by 3GPP. Some gNBs 110 (e.g. gNB 110-2) and/or ng-eNB 114 in FIG. 1A may be configured to function as positioning-only beacons, which may transmit signals (e.g. PRS signals) and/or may broadcast assistance data to assist positioning of UE 105 but may not receive signals from UE 105 or from other UEs. It is noted that while only one ng-eNB 114 is shown in FIG. 1A, some embodiments may include multiple ng-eNBs 114. In some implementations, gNBs 110 and/or ng-eNBs 114 may support location of a UE 105—e.g. by requesting location measurements of PRS transmission from UE 105 and determining a location estimate for UE 105 using the PRS location measurements and other known information such as the locations of the antennas which transmit the measured PRS. In some embodiments, location of UE 105 by a gNB 110 or ng-eNB 114 may be in response to a location request for UE 105 received by the gNB 110 or ng-eNB 114 from the UE 105, from the AMF 115 or from the LMF 120.

As will be discussed in greater detail below, in some embodiments, the gNBs 110 and/or ng-eNB 114 (alone or in combination with other modules/units of the communication system 100) may be configured, in response to receiving a request from a UE 105, LMF 120 or another gNB 110 or another ng-eNB 114, to transmit PRS using an increased quantity of resources. As noted, while FIG. 1A depicts nodes configured to communicate according to 5G NR and LTE communication protocols for an NG-RAN 135, nodes configured to communicate according to other communication protocols may be used, such as, for example, an LTE protocol for an Evolved Universal Mobile Telecommunications System (UMTS) Terrestrial Radio Access Network (E-UTRAN) or an IEEE 802.11x protocol for a WLAN. For example, in a 4G Evolved Packet System (EPS) providing LTE wireless access to UE 105, a RAN may comprise an E-UTRAN, which may comprise base stations comprising evolved Node Bs (eNBs) supporting LTE wireless access. A core network for EPS may comprise an Evolved Packet Core (EPC). An EPS may then comprise an E-UTRAN plus EPC, where the E-UTRAN corresponds to NG-RAN 135 and the EPC corresponds to 5GC 140 in FIG. 1A. The methods and techniques described herein for support of on-demand PRS transmission for UE 105 positioning may be applicable to such other networks.

The gNBs 110 and ng-eNB 114 can communicate with an Access and Mobility Management Function (AMF) 115, which, for positioning functionality, communicates with a Location Management Function (LMF) 120. The AMF 115 may support mobility of the UE 105, including cell change and handover and may participate in supporting a signaling connection to the UE 105 and possibly data and voice bearers for the UE 105. The LMF 120 may support positioning of the UE 105 when UE accesses the NG-RAN 135 and may support position procedures/methods such as Assisted GNSS (A-GNSS), Observed Time Difference of Arrival (OTDOA), Real Time Kinematic (RTK), Precise Point Positioning (PPP), Differential GNSS (DGNSS), Enhanced Cell ID (ECID), Round Trip signal propagation Time (RTT), angle of arrival (AOA), angle of departure (AOD), time of arrival (TOA), receive-transmit time difference (Rx-Tx) and/or other positioning procedures. The LMF 120 may also process location services requests for the UE 105, e.g., received from the AMF 115 or from the GMLC 125. The LMF 120 may be connected to AMF 115 and/or to GMLC 125. In some embodiments, a node/system that implements the LMF 120 may additionally or alternatively implement other types of location-support modules, such as an Enhanced Serving Mobile Location Center (E-SMLC). It is noted that in some embodiments, at least part of the positioning functionality (including derivation of a UE 105's location) may be performed at the UE 105 (e.g., using signal measurements obtained by UE 105 for signals transmitted by wireless nodes such as gNBs 110 and ng-eNB 114, and assistance data provided to the UE 105, e.g. by LMF 120).

The Gateway Mobile Location Center (GMLC) 125 may support a location request for the UE 105 received from an external client 130 and may forward such a location request to the AMF 115 for forwarding by the AMF 115 to the LMF 120 or may forward the location request directly to the LMF 120. A location response from the LMF 120 (e.g. containing a location estimate for the UE 105) may be similarly returned to the GMLC 125 either directly or via the AMF 115, and the GMLC 125 may then return the location response (e.g., containing the location estimate) to the external client 130. The GMLC 125 is shown connected to both the AMF 115 and LMF 120 in FIG. 1A though only one of these connections may be supported by 5GC 140 in some implementations.

A User Plane Function (UPF) 128 may support voice and data bearers for UE 105 and may enable UE 105 voice and data access to other networks such as the Internet 175. UPF 128 functions may include: external Protocol Data Unit (PDU) session point of interconnect to a Data Network, packet (e.g. Internet Protocol (IP)) routing and forwarding, packet inspection and user plane part of policy rule enforcement, Quality of Service (QoS) handling for user plane, downlink packet buffering and downlink data notification triggering. UPF 128 may be connected to a Secure User Plane Location (SUPL) Location Platform (SLP) 129 to enable support of location of UE 105 using the SUPL location solution defined by the Open Mobile Alliance (OMA). SLP 129 may be further connected to or accessible from external client 130.

As illustrated, a Session Management Function (SMF) 126 connects the AMF 115 and the UPF 128. The SMF 126 may have the capability to control both a local and a central UPF within a PDU session. SMF 126 may manage the establishment, modification and release of PDU sessions for UE 105, perform IP address allocation and management for UE 105, act as a Dynamic Host Configuration Protocol (DHCP) server for UE 105, and select and control a UPF 128 on behalf of UE 105.

The external client 130 may be connected to the core network 140 via the GMLC 125 and/or the SLP 129. The external client 130 may optionally be connected to the core network 140 and/or to a location server 120A, which may be, e.g., an SLP, that is external to 5GCN 140, via the Internet 175. The external client 130 may be a server, a web server, or a user device, such as a personal computer, a UE, etc.

As further illustrated in FIG. 1A, the LMF 120 may communicate with the gNBs 110 and/or with the ng-eNB 114 using a New Radio Position Protocol A (which may be referred to as NPPa or NRPPa), which may be defined in 3GPP Technical Specification (TS) 38.455. As further illustrated in FIG. 1A, LMF 120 and UE 105 may communicate using an LTE Positioning Protocol (LPP), which may be defined in 3GPP TS 36.355. LMF 120 and UE 105 may also or instead communicate using a New Radio Positioning Protocol (which may be referred to as NPP or NRPP), which may be the same as, similar to, or an extension of LPP. Here, LPP and/or NPP messages may be transferred between the UE 105 and the LMF 120 via the AMF 115 and a serving gNB 110-1 or serving ng-eNB 114 for UE 105. For example, LPP and/or NPP messages may be transferred between the LMF 120 and the AMF 115 using service operations based on the HyperText Transfer Protocol (HTTP) and may be transferred between the AMF 115 and the UE 105 using a 5G Non-Access Stratum (NAS) protocol. The LPP and/or NPP protocol may be used to support positioning of UE 105 using UE assisted and/or UE based position methods such as A-GNSS, RTK, OTDOA, AOD, RTT and/or ECID. The NRPPa protocol may be used to support positioning of UE 105 using network based position methods such as ECID (e.g. when used with measurements obtained by a gNB 110 or ng-eNB 114) and/or may be used by LMF 120 to obtain location related information from gNBs 110 and/or ng-eNB 114, such as parameters defining PRS transmission from gNBs 110 and/or ng-eNB 114.

With a UE assisted position method, UE 105 may obtain location measurements and send the measurements to a location server (e.g. LMF 120 or SLP 129) for computation of a location estimate for UE 105. For example, the location measurements may include one or more of a Received Signal Strength Indication (RSSI), Round Trip signal propagation Time (RTT), Reference Signal Time Difference (RSTD), Reference Signal Received Power (RSRP), Reference Signal Received Quality (RSRQ), AOA, and/or AOD for gNBs 110, ng-eNB 114 and/or a WLAN access point (AP). The location measurements may also or instead include measurements of GNSS pseudorange, code phase and/or carrier phase for SVs 190. With a UE based position method, UE 105 may obtain location measurements (e.g. which may be the same as or similar to location measurements for a UE assisted position method) and may compute a location of UE 105 (e.g. with the help of assistance data received from a location server such as LMF 120 or broadcast by gNBs 110, ng-eNB 114 or other base stations or APs). With a network based position method, one or more base stations (e.g. gNBs 110 and/or ng-eNB 114) or APs may obtain location measurements (e.g. measurements of RSSI, RTT, RSRP, RSRQ, AOA or Time Of Arrival (TOA)) for signals transmitted by UE 105, and/or may receive measurements obtained by UE 105, and may send the measurements to a location server (e.g. LMF 120) for computation of a location estimate for UE 105.

Information provided by the gNBs 110 and/or ng-eNB 114 to the LMF 120 using NRPPa may include timing and configuration information for PRS transmission and location coordinates. The LMF 120 can then provide some or all of this information to the UE 105 as assistance data in an LPP and/or NPP message via the NG-RAN 135 and the 5GC 140.

An LPP or NPP message sent from the LMF 120 to the UE 105 may instruct the UE 105 to do any of a variety of things, depending on desired functionality. For example, the LPP or NPP message could contain an instruction for the UE 105 to obtain measurements for GNSS (or A-GNSS), WLAN, and/or OTDOA (or some other position method). In the case of OTDOA, the LPP or NPP message may instruct the UE 105 to obtain one or more measurements (e.g. RSTD measurements) of PRS signals transmitted within particular cells supported by particular gNBs 110 and/or ng-eNB 114 (or supported by some other type of base station such as an eNB or WiFi AP). An RSTD measurement may comprise the difference in the times of arrival at the UE 105 of a signal (e.g. a PRS signal) transmitted or broadcast by one gNB 110 and a similar signal transmitted by another gNB 110. The UE 105 may send the measurements back to the LMF 120 in an LPP or NPP message (e.g. inside a 5G NAS message) via the serving gNB 110-1 (or serving ng-eNB 114) and the AMF 115.

As noted, while the communication system 100 is described in relation to 5G technology, the communication system 100 may be implemented to support other communication technologies, such as GSM, WCDMA, LTE, etc., that are used for supporting and interacting with mobile devices such as the UE 105 (e.g., to implement voice, data, positioning, and other functionalities). In some such embodiments, the 5GC 140 may be configured to control different air interfaces. For example, in some embodiments, 5GC 140 may be connected to a WLAN, either directly or using a Non-3GPP InterWorking Function (N3IWF, not shown FIG. 1A) in the 5GC 140. For example, the WLAN may support IEEE 802.11 WiFi access for UE 105 and may comprise one or more WiFi APs. Here, the N3IWF may connect to the WLAN and to other elements in the 5GC 140 such as AMF 115. In some other embodiments, both the NG-RAN 135 and the 5GC 140 may be replaced by other RANs and other core networks. For example, in an EPS, the NG-RAN 135 may be replaced by an E-UTRAN containing eNBs and the 5GC 140 may be replaced by an EPC containing a Mobility Management Entity (MME) in place of the AMF 115, an E-SMLC in place of the LMF 120 and a GMLC that may be similar to the GMLC 125. In such an EPS, the E-SMLC may use LPPa in place of NRPPa to send and receive location information to and from the eNBs in the E-UTRAN and may use LPP to support positioning of UE 105. In these other embodiments, on-demand PRS transmission for positioning of a UE 105 may be supported in an analogous manner to that described herein for a 5G network with the difference that functions and procedures described herein for gNBs 110, ng-eNB 114, AMF 115 and LMF 120 may, in some cases, apply instead to other network elements such eNBs, WiFi APs, an MME and an E-SMLC.

To support certain position methods such as OTDOA using transmission of PRS or other DL signals, base stations may be synchronized. In a synchronized NR network, the transmission timing of gNBs 110 may be synchronized such that each gNB 110 has the same transmission timing as every other gNB 110 to a high level of precision—e.g. 50 nanoseconds or less. Alternatively, the gNBs 110 may be synchronized at a radio frame or subframe level such that each gNB 110 transmits a radio frame or subframe during the same time duration as every other gNB 110 (e.g. such that each gNB 110 starts and finishes transmitting a radio frame or subframe at almost precisely the same times as every other gNB 110), but does not necessarily maintain the same counters or numbering for radio frames or subframes. For example, when one gNB 110 is transmitting a subframe or radio frame with counter or number zero (which may be the first radio frame or subframe in some periodically repeated sequence of radio frames or subframes), another gNB 110 may be transmitting a radio frame or subframe with a different number or counter such as one, ten, one hundred etc.

Synchronization of the transmission timing of ng-eNBs 114 in NG-RAN 135 may be supported in a similar manner to synchronization of gNBs 110, although since ng-eNBs 114 may typically use a different frequency to gNB s 110 (to avoid interference), an ng-eNB 114 may not always be synchronized to gNBs 110. Synchronization of gNBs 110 and ng-eNBs 114 may be achieved using a GPS receiver or a GNSS receiver in each gNB 110 and ng-eNB 114 or by other means such as using the IEEE 1588 Precision Time Protocol.

In the case of on demand transmission of PRS, base stations (BSs), such as gNBs 110 and ng-eNB 114 in communication system 100 or eNBs in an EPS, could each transmit a PRS using a low bandwidth and low duration of PRS on a continuous background basis (e.g., using 1 or 2 subframes per positioning occasion and 1.4 MHz bandwidth in the case of eNBs) and temporarily switch to high bandwidth (e.g. 20 MHz) and/or high duration (e.g., 6 subframes per positioning occasion) when requested by UE 105. To support fast switching between low and high PRS resource allocation, a UE 105 request for high PRS resource allocation could be sent using a Radio Resource Control (RRC) protocol to a serving BS for UE 105 (e.g. a serving gNB 110 or ng-eNB 114 for UE 105 access to NG-RAN 135 or a serving eNB for UE 105 access to E-UTRAN). The serving BS may be configured to transfer or communicate the request to neighboring BSs. The request for high PRS resource allocation could be combined with a request by UE 105 for measurement gaps in the case that PRS is transmitted for some cells using a different frequency and/or different RAT to those for the serving cell for UE 105. A location server (e.g. an E-SMLC for EPS or LMF 120 for 5GC 140) could then provide the UE 105 with the background low resource PRS configuration for the reference and neighbor cells for OTDOA positioning and could also indicate whether switching to high PRS resource allocation was supported. Alternatively, this information could be provided to a UE 105 via periodic broadcast from a gNB 110 (e.g. broadcast in a positioning related SIB). In the case that switching to high PRS resource allocation was supported, the location server (or gNB 110 in the case of information transfer via broadcast) could indicate to the UE 105 the types of increased PRS resource allocation supported such as increased PRS bandwidth, increased PRS subframes per positioning occasion and/or availability of UL frequency for DL PRS transmission (e.g. where the UL frequency is temporarily reassigned to DL PRS transmission). For each supported type of increased PRS resource allocation, the location server (or gNB 110) could also indicate the available amounts of increased PRS resource allocation such as available (or maximum) PRS bandwidth values, available (or maximum) numbers of PRS subframes per positioning occasion and/or one or more DL PRS configurations available on an UL carrier frequency.

When switching to high PRS resource allocation is supported, the UE 105 could send an RRC protocol request to the serving BS (e.g. serving eNB for E-UTRAN access or serving gNB 110 or ng-eNB 114 for NG-RAN 135 access), and include, for example, the PRS frequencies the UE 105 is able to measure, the maximum PRS resource allocation the UE 105 can measure (e.g., the maximum PRS bandwidth and/or maximum number of subframes per PRS positioning occasion), whether the UE 105 supports measurements of DL PRS on an uplink frequency (e.g. an uplink frequency for Frequency Division Duplexing (FDD)), and/or whether measurement gaps are needed. For example, if the location server had indicated to the UE 105 the available amounts of increased PRS resource allocation, the UE 105 could indicate a maximum increased PRS resource allocation, within the available amounts, which the UE 105 is able to measure. The UE 105 may also include the identities of the reference and neighbor cells for OTDOA which may have been previously provided to the UE 105 by a location server (e.g. LMF 120) when requesting OTDOA RSTD, RSRP or Rx-Tx measurements from UE 105. The serving BS could then send a request for increased PRS resource allocation (e.g. higher PRS bandwidth, more subframes per PRS positioning occasion, and/or use of PRS broadcast using uplink frequency) to neighbor BSs for the reference and neighbor cells indicated by the UE 105 (and/or to other neighbor BSs able to support an increased allocation of PRS resources). The serving BS could also optionally send an RRC confirmation to the UE 105 to confirm that the UE 105 request for increased PRS resource allocation will be supported and could provide configuration parameters for the increased PRS transmission such as an increased PRS bandwidth, increased number of PRS subframes per positioning occasion, use of particular subframes and bandwidth for an UL frequency, and/or the identities of cells for which the increased PRS transmission will be supported. The UE 105 would then obtain PRS measurements using the increased PRS resource allocation.

If there was no RRC confirmation from the serving BS, the UE 105 could assume that the increased PRS transmission for the high PRS resource allocation will be supported.

Alternatively, the UE 105 may measure both a high and a low PRS resource allocation and determine which PRS allocation was used by the network from an estimated accuracy of the resulting RSTD (or RSRP or Rx-Tx) measurements. The low PRS resource allocation may correspond to the PRS resource allocation indicated by the location server (e.g. in a previous request for OTDOA RSTD measurements) or by a gNB 110, whereas the high PRS resource allocation may correspond to a high PRS resource allocation indicated by the server (or gNB 110) as being supported or to a high PRS resource allocation indicated by the UE 105 to the serving BS as being supported by the UE 105. The UE 105 could then assume that low PRS resource allocation was used, and could then use only the RSTD measurements (or RSRP or Rx-Tx measurements) for low PRS resource allocation, when the RSTD (or RSRP or Rx-Tx) measurements for the high PRS resource allocation were found to be less accurate than for the low PRS resource allocation or could not be obtained by the UE 105. Similarly, the UE 105 could assume that high PRS resource allocation was used, and use only the RSTD (or RSRP or Rx-Tx) measurements for high PRS resource allocation, when the RSTD (or RSRP or Rx-Tx) measurements for the low PRS resource allocation were found to be less accurate than for the high resource allocation or could not be obtained by the UE 105. Optionally, after the RSTD (or RSRP or Rx-Tx) measurements were obtained, the UE 105 could send another RRC request to the serving BS to advise that increased PRS resource allocation is no longer needed by UE 105.

To support high resource allocation for PRS with Time Division Duplexing (TDD), increased PRS transmission may be dynamically increased by each base station (e.g. gNB 110 or ng-eNB 114) on a per-slot or per-subframe basis—e.g. by dynamically assigning more DL subframes for PRS transmission by certain gNBs 110 and/or ng-eNBs 114. To support high resource allocation for PRS with FDD, certain uplink subframes at certain gNBs 110 and/or ng-eNBs 114 may be temporarily reassigned for downlink PRS transmission. Since (with FDD) the UL frequency would be different to DL frequency used for other PRS transmission, this could improve PRS measurement accuracy by UE 105 due to better frequency diversity. However, involved gNBs 110 and ng-eNBs 114 may need to be time synchronized to avoid interfering with normal UL transmission from UEs in other subframes and a UE 105 may need to be able to receive, acquire and measure DL PRS on an UL frequency carrier. In addition, cross-link interference with UL signaling and UL data transmitted by UEs outside the cells which use DL PRS transmission on UL carriers may need to be avoided or reduced—e.g. using cross-link interference management procedures such as an advanced receiver, scheduling coordination, etc. In addition, the maximum power that may be allowed by local regulations for transmission of DL PRS on uplink frequencies may be much lower than for transmission of DL PRS on downlink frequencies, which may require that DL PRS transmission on uplink frequencies is only used by gNBs 110 and ng-eNBs 114 close to a particular target UE 105.

In some implementations, a permanent level of high resource allocation might be used for PRS transmission (e.g. using increased PRS bandwidth, an increased number of PRS subframes per positioning occasion and/or uplink carrier frequency) but only with a long periodicity (e.g. with one positioning occasion every 1 to 5 minutes) which may allow more accurate location for a UE 105 but with increased latency in obtaining and providing the more accurate location to an external client 130.

To support situations where many UEs may be sending requests for increased PRS resource allocation (or sending requests for an increase in other types of location-determination resources, such as assistance data) at around the same time, a serving BS, referred to here as a "Node A", could send one request to a neighbor BS, referred to here as a "Node B", when increased PRS resource allocation is needed for some UE 105, and could include a validity time T (e.g., 1 minute) for this request. The validity time, T, might be set to a higher value (e.g. 2 to 5 minutes) if the Node A had received many requests for increased PRS resource allocation from UEs over a recent short interval. Further, after sending the request for increased PRS resource allocation to Node B, if the Node A receives a request for increased PRS resource allocation from another UE, it may not send another request for increased PRS resource allocation to the Node B if the previous validity time T has not yet expired. When the validity time T expires at Node B, the Node B can switch back to the background low PRS resource allocation.

Alternatively, the Node B may combine the requests for increased PRS resource allocation received from all neighbor BSs, as well as local requests for increased PRS resource allocation received from UEs served by Node B and maintain a single validity time T* that expires after all the requested validity times have expired. This technique may reduce signaling among BSs (e.g. among gNBs 110 or among ng-eNBs 114) and may ensure that PRS with high resource allocation is transmitted when needed.

Figure 1B:
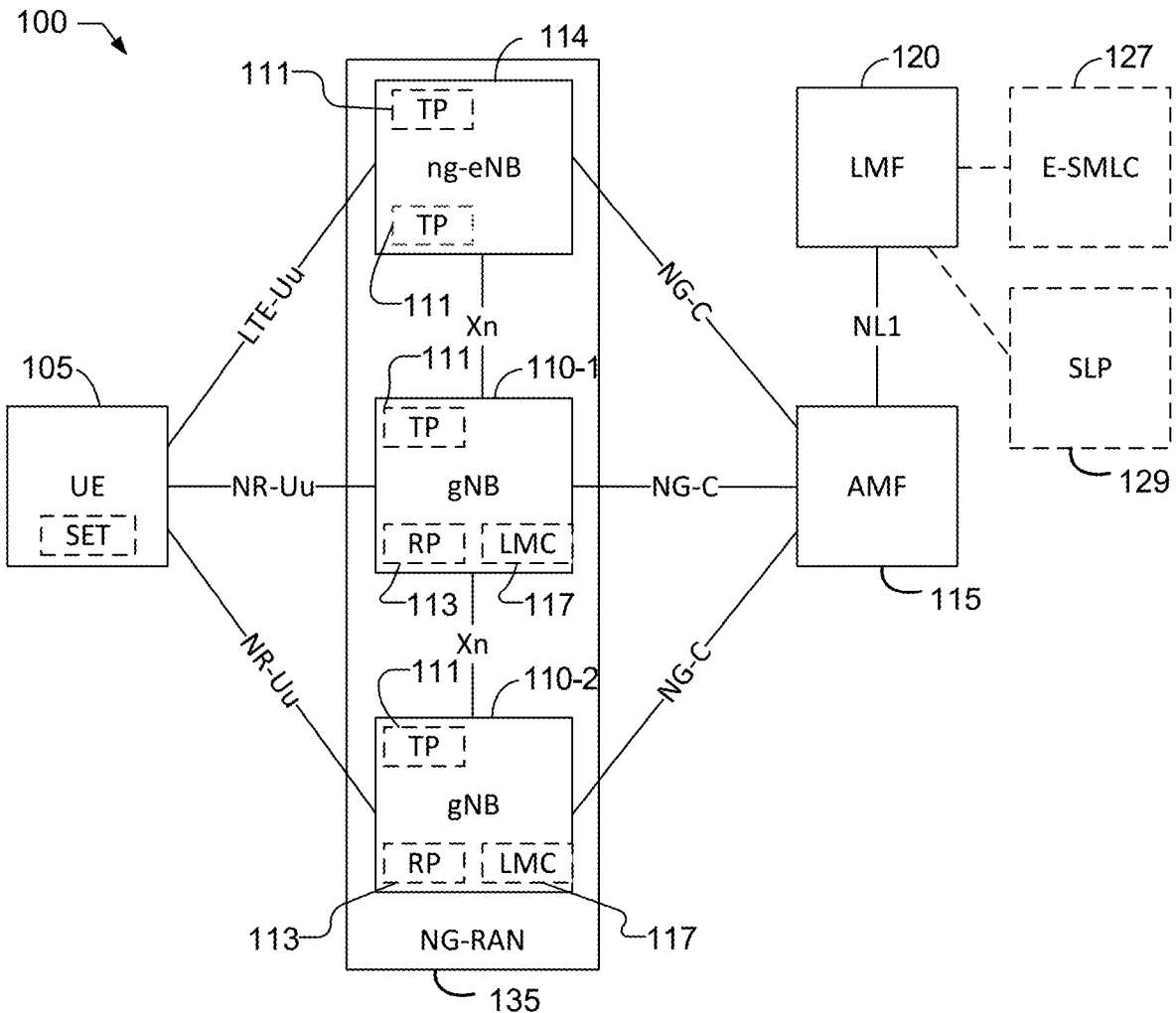
FIG. 1B is a diagram of an example positioning architecture of a communication system to determine a position for a mobile device, according to an embodiment.

FIG. 1B shows a positioning architecture diagram applicable to communication system 100 in FIG. 1A, according to an embodiment. The positioning architecture shown in FIG. 1B can be a subset of the architecture shown in FIG. 1A that is applicable to NG-RAN 135, and shows additional elements in NG-RAN 135 not shown in FIG. 1A, and may be used to support NR RAT dependent position methods. As illustrated, the LMF 120 may be in communication with an Enhanced Serving Mobile Location Center (E-SMLC) 127 (e.g. which may be part of a separate EPC) and a Secure User Plane Location (SUPL) Location Platform (SLP) 129.

It should be noted that the gNB s 110 and ng-eNB 114 may not always both be present in the NG-RAN 135. Moreover, when both the gNBs 110 and ng-eNB 114 are present, the NG-C interface with the AMF 115 may only present for one of them.

As illustrated, a gNB 110 may be allowed to control one or more Transmission Points (TPs) 111, such as remote radio heads, or broadcast-only TPs for improved support of DL position methods such as OTDOA, AOD, RTT or ECID. Additionally, a gNB 110 may be allowed to control one or more Reception Points (RPs) 113, such as remote radio heads or internal Location Measurement Units (LMUs) for UL measurements for position methods such as Uplink Time Difference of Arrival (UTDOA), AOA, RTT or ECID. In some implementations, a TP 111 and RP 113 may be combined into a Transmission Reception Point (TRP) (not shown in FIG. 1B) which performs the functions of both a TP 111 and an RP 113. A TP 111, RP 113 and/or a TRP may be part of or may comprise a Distributed Unit (DU, also referred to as gNB-DU) in a gNB 110 which manages UL and/or DL transmission and reception for one or more cells according to 5G NR. Further, a gNB 110 may include a Location Management Component (LMC) 117 (also referred to as a "local LMF"), which may be a location server (or location server function) enabled to support positioning of a target UE 105 in a serving gNB 110 or a neighboring gNB 110 for UE 105. Positioning of a UE 105 by an LMC 117 in a serving or neighboring gNB 110 can be used to provide a location service to a UE 105, serving AMF 115 or LMF 120 and to improve NG-RAN operation—e.g. by assisting with handover and distribution of UEs among available NG-RAN nodes.

An LMC 117 may support positioning of a UE 105 in a similar or identical manner to an LMF 120 and may support the same or similar position methods (e.g. OTDOA, RTT, AOD, AOA, UTDOA, ECID, A-GNSS, RTK). An LMC 17 may be part of a Central Unit (CU, also referred to as gNB-CU) in a gNB 110, where the CU may also manage and control the overall operation of the gNB 110 and serve as an endpoint for RRC communication with a UE 105, Xn communication with another gNB 110, NGAP communication with an AMF 154 and/or NRPPa communication with an LMF 120.

Alternatively, LMC 117 may be a separate element in a gNB 110 and be connected to a CU in the gNB 110 (e.g. using an F1 interface). For example, the LMC 117 may request location measurements from the UE 105, e.g., using RRC or LPP, may manage UL location measurements by one or more gNBs 110 of the UE 105, and may provide cell database assistance data and/or UL location measurements to a UE 105 for position methods such as OTDOA, AOD and RTT. The LMC 117 may further manage static and dynamic scheduling of PRS broadcast and broadcast of assistance data by one or more gNBs 110, interact with neighboring gNBs 110 (e.g. using XnAP and NRPPa) to coordinate location support, e.g., exchange location measurements for a UE 105 or coordinate changes to PRS transmission. The LMC 117 may determine a location estimate for a UE 105. The LMC 117 may provide a location service capability to a serving AMF (e.g. using a Next Generation Application Protocol (NGAP)), provide a location service capability to an LMF 120 (e.g. using NRPPa), and provide a location service capability to a UE 105 (e.g. using RRC or LPP).

Peer level LMCs 117 may communicate using an Xn Application Protocol (XnAP) or a location specific protocol above XnAP in order to coordinate support of these functions, e.g. to enable continuing location of a UE 105 following a handover of UE 105 to a new serving gNB 110.

Thus, an LMC 117 may allow or support NG-RAN 135 determination of a UE 105 location which can be requested by the UE 105 (e.g. using RRC or LPP), by a serving AMF 154 (e.g., using NGAP), by another gNB 110 (e.g. using XnAP) or by an LMF 120 (e.g. using NRPPa). Such a capability could allow location support without the need for an LMF 120 (or GMLC 125 (shown in FIG. 1A) in the 5GC 140 and can also be used to reduce latency in position determination (since the NG-RAN 135 is closer to a UE 105 than an LMF 120) and offload location support from an LMF 120.

Figure 2:
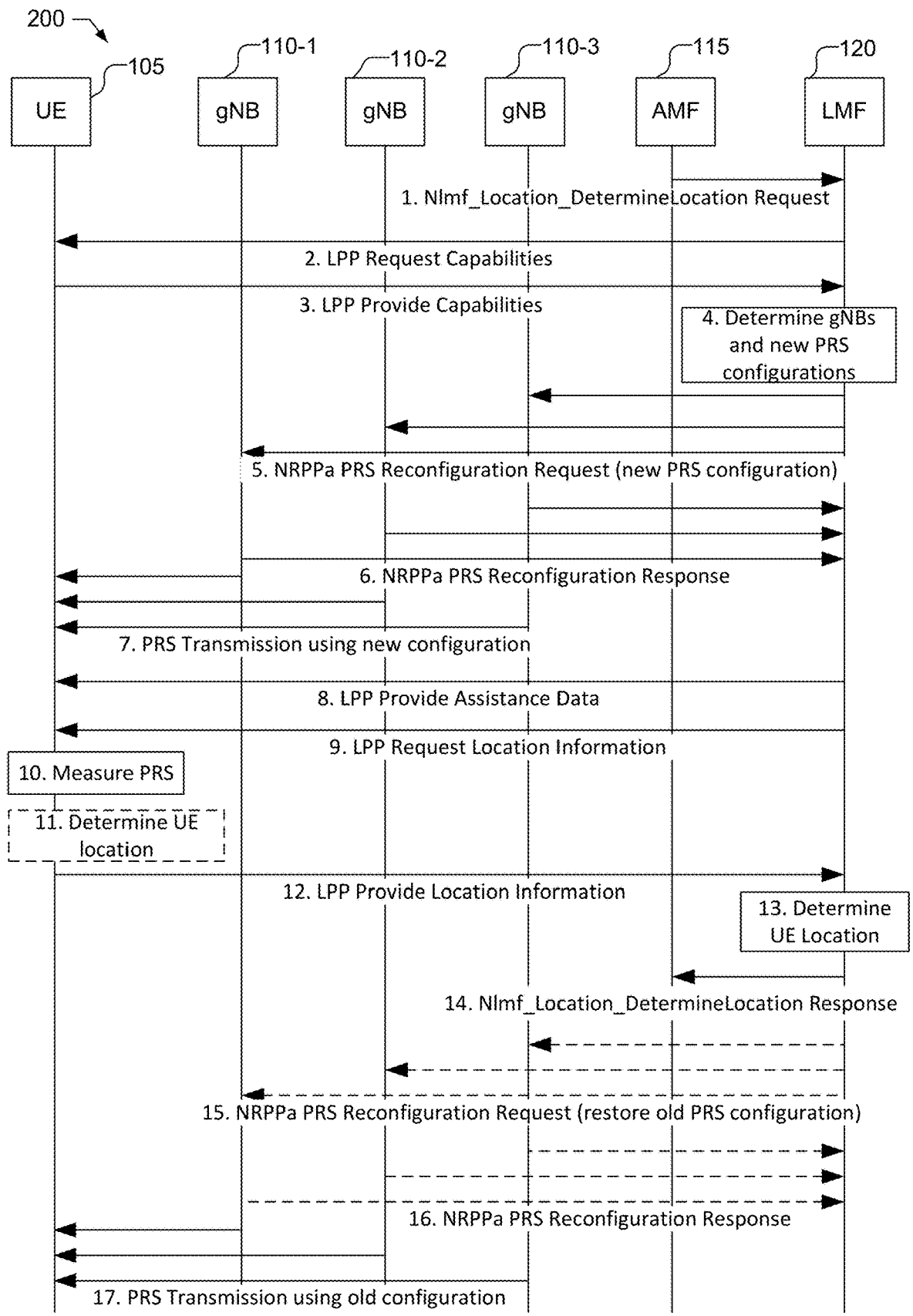
FIG. 2 is a signaling flow showing messages sent between components of a communication network with a Location Management Function (LMF) control of PRS transmissions.

FIG. 2 shows a signaling flow 200 that illustrates various messages sent between components of the communication system 100 depicted in FIGS. 1A and 1B, during a location session between the UE 105 and the LMF 120. While the flow diagram 200 is discussed, for ease of illustration, in relation to a 5G NR wireless access using gNBs 110, signaling flows similar to FIG. 2 involving ng-eNBs 114 or eNBs rather than gNBs 110 will be readily apparent to those with ordinary skill in the art. Furthermore, in some embodiments, the UE 105 itself may be configured to determine its location using, for example, assistance data provided to it. In the signaling flow 200, it is assumed that the UE 105 and LMF 120 communicate using the LPP positioning protocol referred to earlier, although use of NPP or a combination of LPP and NPP is also possible.

FIG. 2 illustrates a procedure for LMF control of PRS transmission by gNBs 110, which may be used to assist downlink (DL) positioning of UEs using LPP for such position methods as OTDOA, ECID, AOA, RTT and AOD which are controlled by the LMF 120. An LMF 120 would then determine changes to PRS transmission and send a message (e.g. an NRPPa message) to affected gNBs 110 to request a change to PRS transmission. The LMF 120 could determine the changes based on QoS requirements for location requests and on the capabilities of target UEs (e.g. UE 105) and gNBs 110 (e.g. if gNB capabilities are configured in the LMF 120) to support increased PRS transmission. The LMF 120 could control PRS transmission from gNBs 110 and/or from TPs 111 and/or TRPs within gNBs 110. Thus, one or more of gNBs 110 in FIG. 2 could each be replaced by a TP 111 or a TRP. In addition or instead, in some embodiments, LMF 120 in FIG. 2 may be replaced by an LMC 117.

At stage 1 in FIG. 2 (e.g. and in response to receiving a location request for UE 105 from another entity such as GMLC 125), the serving AMF 115 for UE 105 invokes an Nlmf_Location_DetermineLocation service operation towards the LMF 120 to request the current location of the UE 105. The service operation may include the serving cell identity, the LCS client type and may include a required QoS.

At stage 2, the LMF 120 sends an LPP Request Capabilities message to the UE 105 (also referred to as the "target UE" 105) to request the positioning capabilities of the UE 105.

At stage 3, the UE 105 returns an LPP Provide Capabilities message to the LMF 120 to provide the positioning capabilities of the UE 105. The positioning capabilities may include the DL PRS measurement capabilities of the UE 105.

At stage 4, and based on the LCS client type (e.g. an emergency services client type or a commercial client type), the quality of service (QoS) if provided at stage 1, the DL PRS measurement capabilities of the UE 105, and/or the capabilities of gNBs 110 to support increased transmission of PRS (e.g. which may be configured in LMF 120 or requested by LMF 120 from each gNB 110), the LMF 120 determines gNBs 110 nearby to the location of the UE 105 (e.g. as indicated by the serving cell ID received at stage 1) to be measured by the UE 105 and a PRS configuration or a new PRS configuration for each of the gNBs 110. The LMF 120 may determine a new PRS configuration for a gNB 110 when the LMF 120 is aware of (e.g. is configured with) a normal default "old" PRS configuration for the gNB 110 and determines that an increase in PRS transmission from this gNB 110 is needed. The LMF 120 may also determine a PRS configuration for a gNB 110 when the LMF 120 is not aware of (e.g. is not configured with) a normal default "old" PRS configuration for the gNB 110 and determines that a particular level of PRS transmission from this gNB 110 is needed. In either case, the PRS configuration that is determined for a gNB 110 is referred to herein as a "new PRS configuration".

The determination at stage 4 may also be based on location requests for other UEs nearby to the target UE 105 which are received by the LMF 120 at about the same time. The new PRS configuration for each gNB 110 may use increased PRS bandwidth, a longer duration of PRS positioning occasions, PRS transmission on new (e.g. more) frequencies, and/or a higher frequency of PRS positioning occasions and may, in some cases, be selected from a set of one or more preconfigured (or predefined) sets of PRS configuration parameters to support increased PRS transmission. In the case of support for directional PRS beams by gNBs 110 (where PRS transmission is directed across a narrow range of horizontal and/or vertical angles, such as angles spanning 5-20 degrees), the LMF 120 may determine directional PRS beams for each gNB 110 which should be received by the target UE 105 (or by any UE in a set of target UEs when the LMF 120 increases PRS transmission for multiple target UEs), and may provide a new PRS configuration only for these directional PRS beams. The directional PRS beams may be selected by the LMF 120 according to a known approximate location for the target UE 105 (or known approximate locations for a set of target UEs), e.g. as given by the serving cell provided in stage 1.

At stage 5, the LMF 120 sends an NRPPa PRS Reconfiguration Request message to each of the gNBs 110 determined at stage 4 and includes the new PRS configuration determined for that gNB 110. The request may also include a start time for each new PRS configuration and/or a duration.

At stage 6, each of the gNBs 110 returns a response to the LMF 120 indicating whether the new PRS configuration can be supported (or is now being transmitted). If some gNBs 110 indicate that a new PRS configuration cannot be supported, the LMF 120 may perform stages 15 and 16 to restore the old PRS configurations in each of the gNBs 110 which indicated a new PRS configuration can be supported in order to avoid interference between gNBs 110 which support the new PRS configuration and gNB s 110 which do not. In this case, the LMF 120 would provide the old PRS configurations to the UE 105 at stage 8 instead of the new PRS configurations. In one embodiment, if a gNB 110 is not able to support the requested new PRS configuration (e.g. due to a lack of resources at the current time), it may provide a list of possible alternative PRS configurations in the response at stage 6 or may switch to transmitting some other new PRS configuration that supports increased PRS transmission and indicate this new PRS configuration at stage 6. The LMF 120 may then repeat stages 5 and 6 for some or all of the determined gNBs 110 with different new PRS configurations.

At stage 7, each of the gNBs 110 which acknowledged support of a new PRS configuration at stage 6 changes from an old PRS configuration to a new PRS configuration either after (or just before) sending the acknowledgment at stage 6 if no start time was provided or at the start time indicated in stage 5. In some cases, the old PRS configuration may correspond to not transmitting a DL PRS.

At stage 8, the LMF 120 sends an LPP Provide Assistance Data message to the target UE 105 to provide the new PRS configurations determined at stage 4 and acknowledged at stage 6 and possibly other assistance data to assist the UE 105 to acquire and measure the new PRS configurations and optionally determine a location from the PRS measurements.

At stage 9, the LMF 120 sends an LPP Request Location Information message to the target UE 105 to request the UE 105 to measure DL PRS transmission by the gNBs 110 determined at stage 4 (and confirmed at stage 6) according to the new PRS configurations. For example, the LMF 120 may request measurements of RSTD if OTDOA is used, Rx-Tx if RTT is used and/or RSRP if AOD is used. The LMF 120 may also indicate whether UE based positioning is requested whereby the UE 105 determines its own location. In some implementations, the LMF 120 may also include in the LPP Request Location Information message a request for location measurements for other position methods which do not use PRS (e.g. WiFi positioning or A-GNSS positioning).

At stage 10, the target UE 105 acquires and measures the DL PRS transmitted by the gNBs 110 indicated at stage 8 according to the new PRS configurations provided at stage 8. For example, the UE 105 may obtain RSTD measurements when OTDOA is used, TOA or Rx-Rx measurements when RTT is used, or AOA or RSRP measurements when AOA or AOD is used. The UE 105 may also obtain other non-PRS measurements in addition if requested at stage 9.

At stage 11, if UE 105 based positioning was requested at stage 9, the UE 105 determines its location based on the PRS measurements (and any other measurements) obtained at stage 10 and the assistance data received at stage 8.

At stage 12, the UE 105 sends an LPP Provide Location Information message to the LMF 120 and includes the PRS measurements (and any other measurements) obtained at stage 10 or the UE location obtained at stage 11.

At stage 13, the LMF 120 determines the UE location based on any PRS measurements (and any other measurements) received at stage 12 or may verify a UE location received at stage 12.

At stage 14, the LMF 120 returns an Nlmf_Location_DetermineLocation Response to the AMF 115 to return the location obtained at stage 13. The AMF 115 may then forward the location to another entity (e.g. GMLC 125) (not shown in FIG. 2).

At stage 15, if a duration was not included at stage 5, the LMF 120 may send an NRPPa PRS Reconfiguration Request message to each of the gNBs 110 determined at stage 4 and includes a request to restore the old PRS configuration for each gNB 110.

At stage 16, each of the gNBs 110 returns a response to the LMF 120 indicating whether the old PRS configuration can be restored.

At stage 17, each of the gNBs 110 begins transmitting the old PRS configuration either when the duration received in stage 5 expires or after receiving and acknowledging the request to restore the old PRS configuration at stages 15 and 16.

Figure 3:
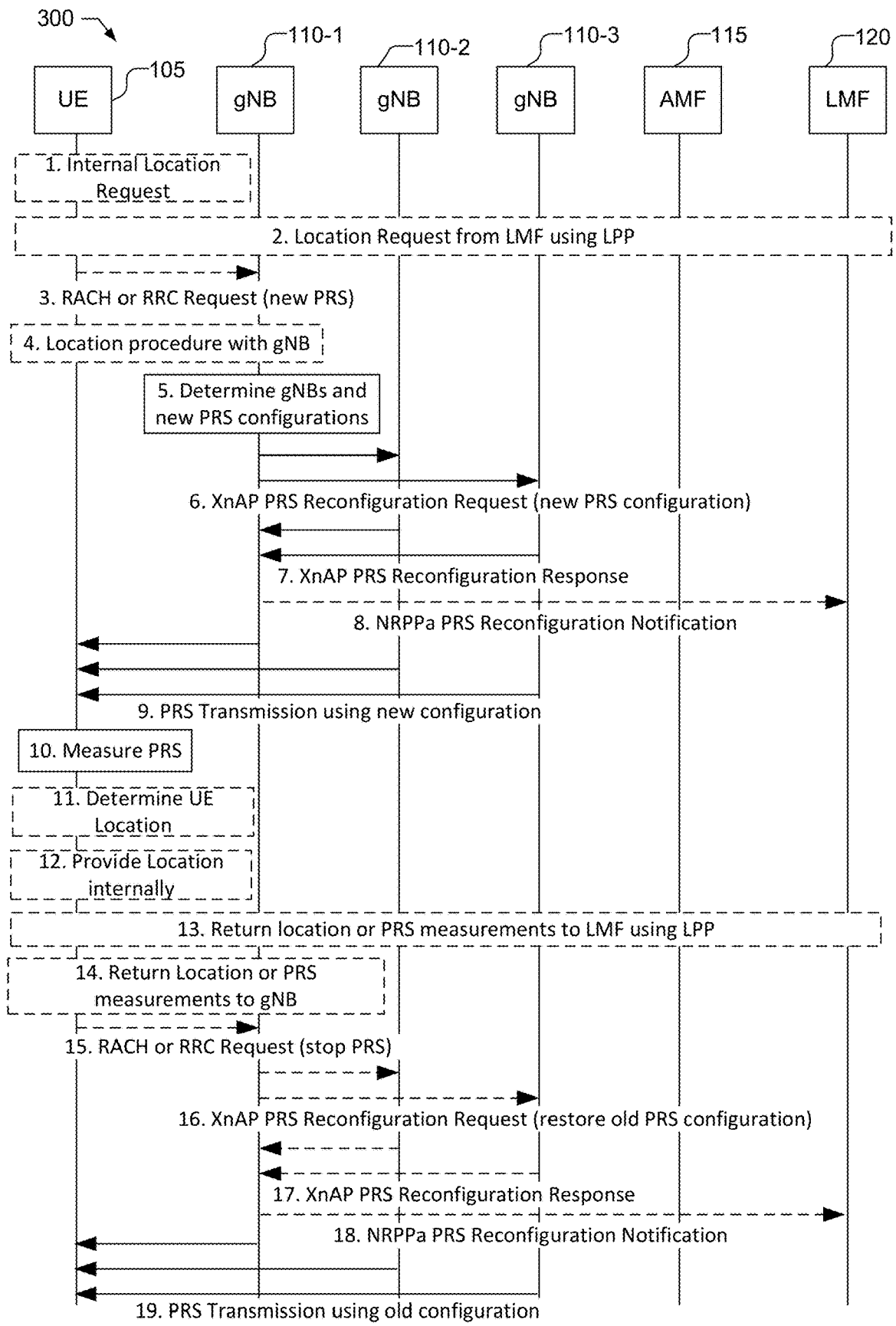
FIG. 3 is a signaling flow showing messages sent between components of a communication network with a gNB control of PRS transmissions.

FIG. 3 shows a signaling flow 300 illustrating messages communicated between various components of the communication system 100 of FIGS. 1A and 1B with gNB control of DL PRS transmission. In a procedure in which there is gNB control of DL transmission, a gNB 110 (e.g. a gNB 110 CU) would determine changes to PRS transmission for one or more UEs served by or camped on the gNB 110 and would send a message (e.g. an Xn Application Protocol (XnAP) message) to neighboring gNBs 110 to request a similar change to PRS transmission. The gNB 110 could determine the PRS change based on UE 105 requests to the gNB 110 for increased PRS transmission and/or to support location procedures for one or more UEs that are controlled by or at least involve the gNB 110. The gNB 110 could base the PRS change on requests from, or location procedures for, multiple UEs—e.g. by only changing PRS when many UEs need (e.g. request) an increase in DL PRS transmission. While the signaling flow in FIG. 3 is discussed, for ease of illustration, in relation to 5G NR wireless access using gNBs 110, signaling flows similar to FIG. 3 involving ng-eNBs 114, eNBs or other TPs 111 or TRPs rather than gNBs 110 will be readily apparent to those with ordinary skill in the art. Thus, one or both of gNBs 110-2 and 110-3 in FIG. 3 could each be replaced by a TP 111 or a TRP.

In the procedure illustrated in FIG. 3, a UE request for increased PRS transmission may use a random access procedure or a CCCH RRC message (e.g. when the UE is idle) or some other RRC message (e.g. when the UE is connected). As an example, the RRC LocationMeasurementIndication message that is defined in 3GPP TS 38.331 that can be used to request measurements gaps for OTDOA for LTE access could be extended to include a request for increased PRS transmission as well as a request for measurement gaps for NR.

At stage 1 in FIG. 3, in some scenarios, the UE 105 receives a location request from an internal client (e.g. an App).

At stage 2, in other scenarios, the UE 105 receives a location request from an LMF 120—e.g. using LPP.

At stage 3, if stage 1 or 2 occurs, the UE 105 may determine that an increase in PRS transmission is needed (e.g. increased PRS bandwidth, increased duration of positioning occasions or PRS transmission from more nearby gNBs) to meet QoS requirements. The UE 105 then sends a random access request or CCCH RRC request to a camped-on gNB 110-1 when in idle state or some other RRC request to a serving gNB 110-1 when in connected state and includes a request for increased PRS transmission. The request may include the PRS capabilities of the UE 105 and/or parameters for preferred PRS configurations (e.g. which may include a preferred PRS bandwidth, a preferred duration of PRS positioning occasions and/or preferred PRS beam directions for certain gNBs if known by the UE 105) and a preferred number of nearby gNBs 110 to which this applies. In order to reduce signaling bits, gNBs 110 may indicate supported PRS configurations to UEs including full parameter details (e.g. in positioning SI messages) to allow a UE 105 to indicate preferred or supported PRS configurations by referencing the PRS configurations supported by the gNBs 110 (e.g. using a bit map or integer).

At stage 4, for other scenarios where stages 1-3 do not occur, a serving gNB 110-1 or an LMC 117 in the serving gNB 110-1 may need to obtain or assist in obtaining a location for the UE 105 using a location procedure between the UE 105 and gNB 110-1 or LMC (e.g. controlled using RRC or LPP). The location procedure may be instigated at the serving gNB 110-1 or LMC 117 by a location request received from the UE 105 (e.g. using RRC or LPP), a location request for the UE 105 received from a serving AMF 115 (e.g. using the Next Generation Application Protocol (NGAP)), or a location request for the UE 105 received from an LMF 120 (e.g. using NRPPa). In each of these cases, the serving gNB 110-1 or LMC 117 may determine that increased PRS transmission is needed to support the location procedure (e.g. to enable the serving gNB 110-1 or LMC 117 to request and obtain DL PRS measurements from the UE 105 as part of the location procedure).

At stage 5, based on the request in stage 3 or the requirements for the location procedure in stage 4, a quality of service (QoS) (e.g. if provided at stage 3 or stage 4), the DL PRS measurement capabilities of the UE 105 (e.g. if obtained in stage 3 or stage 4), and/or the capabilities of the gNB 110-1 and/or other gNBs 110 to support increased transmission of PRS (e.g. which may be configured in gNB 110-1), the serving or camped-on gNB 110-1 (or the gNB 110-1 that includes the LMC 117) determines a new PRS configuration for itself and may determine nearby gNBs 110 and a new PRS configuration for each of these gNBs 110 (e.g. based on a preferred number of gNBs indicated at stage 3 or determined as part of stage 4). The gNB 110-1 may determine a new PRS configuration for another gNB 110 when the gNB 110-1 is aware of (e.g. is configured with) a normal default "old" PRS configuration for the other gNB 110 and determines that an increase in PRS transmission from this gNB 110 is needed. The gNB 110-1 may also determine a PRS configuration for another gNB 110 when the gNB 110-1 is not aware of (e.g. is not configured with) a normal default "old" PRS configuration for the other gNB 110 and determines that a particular level of PRS transmission from this gNB 110 is needed. In either case, the PRS configuration that is determined for another gNB 110 is referred to herein as a "new PRS configuration"

The determination at stage 5 may also be based on PRS requests received from other UEs as in stage 3 and/or on location procedures for other UEs as in stage 4 which occur at about the same time. The new PRS configuration for each gNB 110 may use increased PRS bandwidth, a longer duration of PRS positioning occasions, PRS transmission on new frequencies, and/or a higher frequency of PRS positioning occasions and may, in some cases, be selected from a set of one or more preconfigured sets of PRS configuration parameters to support increased PRS transmission. In the case of support for directional PRS beams, the serving or camped-on gNB 110-1 may determine directional PRS beams for each gNB 110 which should be received by the target UE 105, or by any UE 105 in a set of target UEs when the gNB 110 increases PRS transmission for multiple target UEs, and may provide a new PRS configuration only for these directional PRS beams. The directional PRS beams may be selected by the serving or camped-on gNB 110-1 according to a known approximate location for the target UE 105 (or known approximate locations for a set of target UEs), e.g. as given by the coverage area of the serving or camped-on cell for each UE 105.

At stage 6, if nearby gNBs 110 were determined at stage 5, the serving or camped-on gNB 110-1 sends an XnAP PRS Reconfiguration Request message to each of these gNBs 110 and includes the new PRS configuration determined at stage 5 for each gNB 110. The request may also include a start time for each new PRS configuration and/or a duration and may include the PRS configurations and the identities for some or all of the gNBs 110 determined at stage 5 so that each gNB 110 can correctly include the PRS configurations for these gNBs 110 in SI messages sent by each gNB 110 at stage 9.

At stage 7, if stage 6 occurs, each of the gNBs 110 returns a response to the serving or camped-on gNB 110-1 indicating whether the new PRS configuration can be supported (or is now being transmitted). If some gNBs 110 indicate that a new PRS configuration cannot be supported, the serving or camped-on gNB 110-1 may perform stages 16 and 17 to restore the old PRS configuration in each gNB 110 which indicated a new PRS configuration can be supported in order to avoid interference between gNBs 110 which support a new PRS configuration and gNB s 110 which continue to support an old PRS configuration. In this case, stages 8 and 9 are omitted and the procedure continues with the UE 105 measuring the old PRS for all gNB s 110 at stage 10. In one embodiment, if a gNB 110 is not able to support the requested new PRS configuration (e.g. due to a lack of resources at the current time), it may provide a list of possible alternative PRS configurations in the response at stage 7 or may switch to transmitting some other new PRS configuration that supports increased PRS transmission and indicate this new PRS configuration at stage 7. The gNB 110-1 may then repeat stages 6 and 7 for some or all of the determined gNBs 110 with different new PRS configurations.

At stage 8, optionally, the serving or camped-on gNB 110-1 sends an NRPPa PRS Reconfiguration Notification to one or more LMFs 120 and includes the new PRS configuration for each gNB 110 which acknowledged a new PRS configuration in stage 7. For example stage 8 may be performed for an LMF 120 when the LMF 120 previously sent a request to the gNB 110-1 for notifications of changes to PRS transmission at the gNB 110-1 and/or at other gNBs 110.

At stage 9, each of the gNBs 110 which acknowledged a new PRS configuration at stage 7 (as well as gNB 110-1) changes from an old PRS configuration to the new PRS configuration either after (or just before) sending the acknowledgment at stage 7 if no start time was provided or at the start time indicated in stage 6. In some cases, the old PRS configuration may correspond to not transmitting a DL PRS. Each gNB 110 may also provide an indication of the new PRS configurations for itself and one or more nearby gNBs 110 in SI messages (e.g. positioning SI messages) to enable served or camped-on UEs to become aware of the new PRS configurations.

At stage 10, the target UE 105 acquires and measures the PRS transmission by one or more gNBs 110 at stage 9 according to the new PRS configurations. For example the UE 105 may obtain RSTD measurements when OTDOA is used, TOA or Rx-Rx measurements when RTT is used, or AOA or RSRP measurements when AOA or AOD is used. The UE 105 may determine the new PRS configurations from SI messages transmitted by the serving or camped-on gNB 110-1 or from an RRC message sent by a serving gNB 110-1 as part of a location procedure between the UE 105 and serving gNB 110-1 (or LMC 117) in the case that stage 4 occurs.

At stage 11, if stage 1 occurred or if UE 105 based positioning was requested as part of stage 2 or stage 4, the UE 105 determines its location based on the PRS measurements obtained at stage 10 and any assistance data that was received (e.g., in SI messages from the serving or camped-on gNB 110-1 when stage 1 occurs, from the serving gNB 110-1 when stage 4 occurs or from the LMF 120 when stage 2 occurs).

At stage 12, if stage 1 occurs, the UE 105 provides the location obtained at stage 11 to the internal client (e.g. an App).

At stage 13, if stage 2 occurs, the UE 105 sends the location obtained at stage 11 when stage 11 occurs or the PRS measurements obtained at stage 10 to the LMF 120 (e.g. using LPP).

At stage 14, if stage 4 occurs, the UE 105 may return the location obtained at stage 11 when stage 11 occurs or the PRS measurements obtained at stage 10 to the serving gNB 110-1 or LMC 117 as part of the location procedure with the serving gNB 110-1 or LMC 117.

At stage 15, after the PRS measurements at stage 10 are complete and if stage 3 occurs, the UE 105 may send a random access request to the same camped-on gNB 110-1 as at stage 3 (or possibly a different gNB 110) when in idle state or an RRC request to the same serving gNB 110-1 (or possibly a different gNB 110) when in connected state and includes an indication that increased PRS transmission is no longer needed. In the case of a random access request, the UE 105 may include a common identifier in the requests sent at stages 3 and 15 to enable the camped-on gNB 110-1 to associate the two requests.

At stage 16, if a duration was not included at stage 6 and if a request was received at stage 15 and if other gNBs 110 were determined at stage 5, the serving or camped-on gNB 110-1 may send an XnAP PRS Reconfiguration Request message to each of the gNBs 110 which acknowledged a new PRS configuration at stage 7 and includes a request to restore the old PRS configuration for each gNB 110. When increased PRS transmission was due to requests or location procedures for multiple UEs, the serving or camped-on gNB 110-1 may wait until increased PRS transmission is no longer needed for these UEs (e.g. as indicated by stages similar to stage 15 for these UEs or by termination of location procedures between the UEs and the gNB 110-1 or LMC 117) before sending the XnAP PRS Reconfiguration Request messages to the gNBs 110 at stage 16 to restore the old PRS configurations.

At stage 17, each of the gNBs 110 may return a response to the serving or camped-on gNB 110-1 indicating whether the old PRS configuration can be restored.

At stage 18, optionally, the serving or camped on gNB 110-1 sends an NRPPa PRS Reconfiguration Notification to one or more LMFs 120 and includes an indication of restoring the old PRS configuration for each gNB 110 which acknowledged the old PRS configuration in stage 17.

At stage 19, each of the gNBs 110 begins transmitting the old PRS configuration when the duration received (or sent) in stage 6 expires, after receiving and acknowledging the request to restore the old PRS configuration at stages 16 and 17, or after determining that increased PRS transmission is no longer needed (e.g. following stage 15 when stage 15 occurs) in the case of the serving or camped-on gNB 110-1.

An increase in PRS transmission from one gNB 110 may cause interference to transmission from other gNBs 110 and to transmission from UEs with TDD. Similarly, transmission from other gNBs 110 may interfere with increased PRS transmission from a gNB 110.

In a synchronized or approximately synchronized NG-RAN 135, interference can be reduced by using the same PRS configuration in each cell with regard to bandwidth, carrier frequency, subcarriers and duration and occurrence of positioning occasions. In this case, in each cell, PRS can either be transmitted or muted during the same time intervals for the same set of subcarriers and may only interfere with and receive interference from PRS transmitted in other cells. However, when additional resource elements (REs) are assigned in one cell to increase PRS transmission in this cell, the PRS transmission in these additional REs can interfere with and receive interference from corresponding non-PRS REs for other cells.

To avoid or reduce the additional interference caused by increased PRS transmission, the following alternatives are possible. A first option (referred to as "Option 1") is to increase PRS transmission over a whole network in a consistent manner such that the same set of additional REs are either used for increased PRS transmission or are muted at each subframe occurrence (for the increased PRS transmission) in every cell. A second option (referred to as "Option 2") is to increase PRS transmission over one contiguous target area of a network and create a buffer zone around the target area in which counterparts to the additional REs assigned for increased PRS transmission within the target area are muted for cells within the buffer zone. The buffer zone can reduce interference between non-PRS transmission from cells outside the buffer zone and the additional PRS transmission from cells within the target area.

Figure 4:
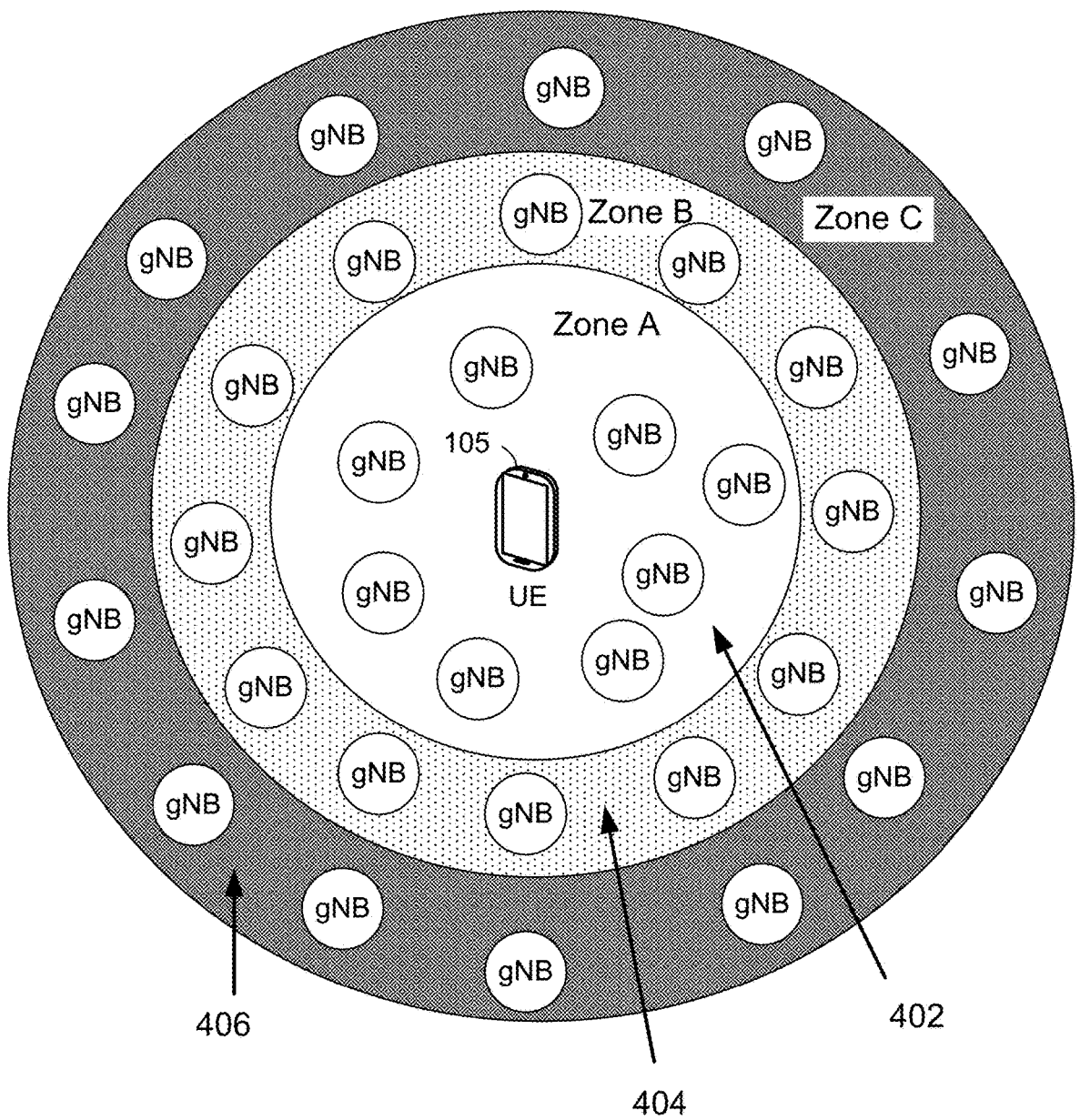
FIG. 4 is a diagram of a zoning technique using muting to prevent interference during increased PRS transmission in a wireless network.
Figure 5:
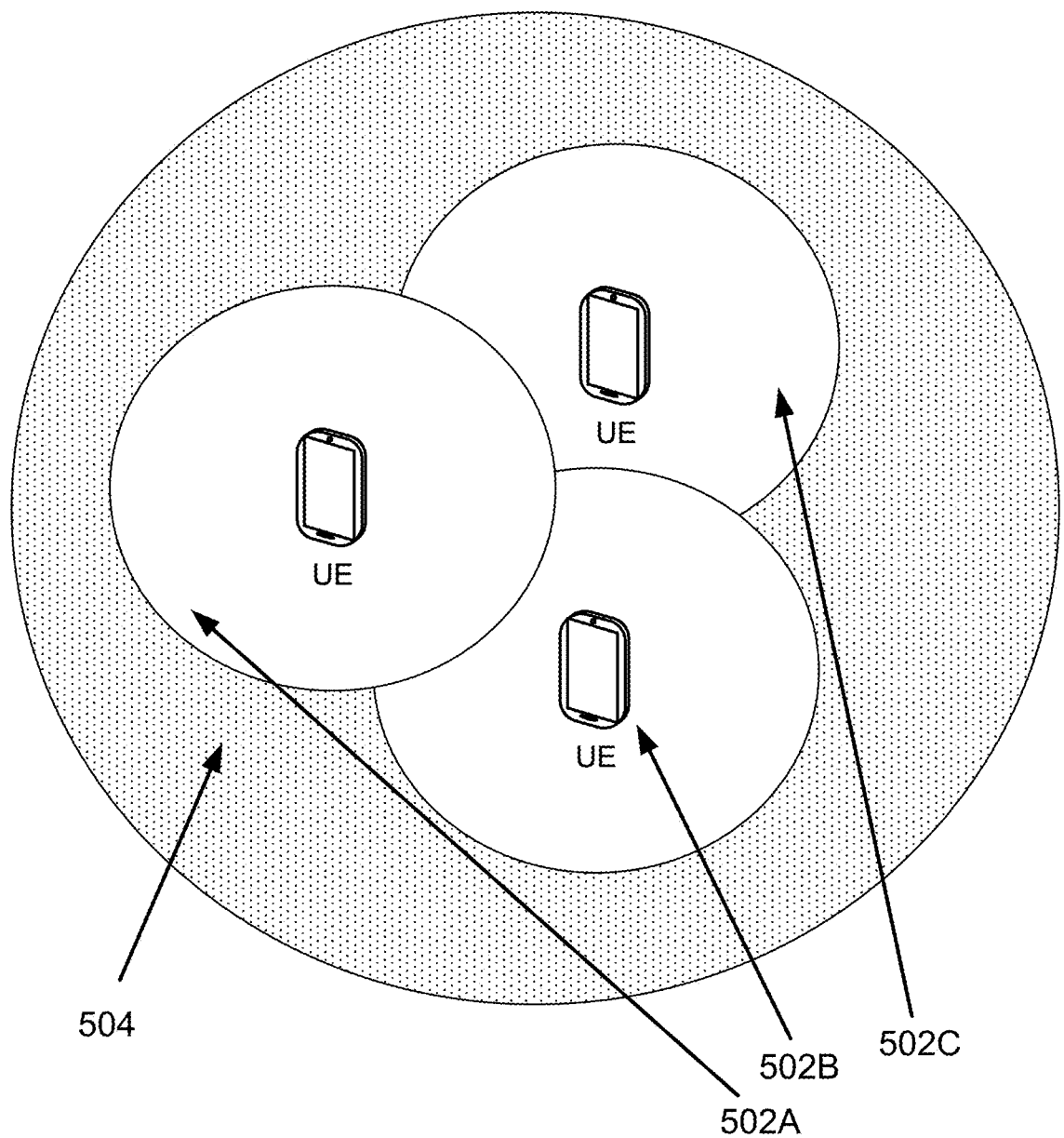
FIG. 5 is a diagram of combining zones in the zoning technique of FIG. 4.

FIG. 4, by way of example, illustrates the use of zoning, e.g., in a system, which may correspond to communication system 100. FIG. 4 illustrates three concentric zones that surround a UE 105. Zone A, which includes the UE 105 and possibly other UEs, is a target area 402 of increased PRS transmission and, thus, the gNBs (e.g. gNBs 110 in communication system 100) transmit PRS using increased resource allocation. Zone B, which surrounds zone A, is a buffer zone 404 in which gNBs (e.g. gNBs 110) use normal PRS transmission and muting of resource elements (REs) corresponding to the REs used for the increased PRS transmission in Zone A. Zone C, which surrounds zone B, is a normal PRS transmission area 406 and, thus, gNBs (e.g. gNBs 110) may transmit normal PRS (e.g., at a low resource allocation). The target area 402 (e.g., zone A in FIG. 4) would include the approximately known location(s) (e.g. the serving cell coverage area(s)) of the target UE(s) 105 for the increased PRS transmission and might include additional gNBs 110 and associated cells at the periphery which contain no target UEs 105 in order to improve the geometry for increased PRS transmission for the target UEs 105. In the event that there are several different target areas that need increased PRS transmission (e.g. for one or more UEs 105 in each separate area), the target areas may be combined if overlapping or close to one another and may use a combined buffer zone which surrounds the combined set of areas. FIG. 5 by way of example, illustrates three separate target areas 502A, 502B, and 502C having increased PRS transmission that are combined into a single target area, and is surrounded by a combined buffer zone 504 with normal PRS transmission and muting of REs used for increased PRS transmission in the combined target area.

Figure 6:
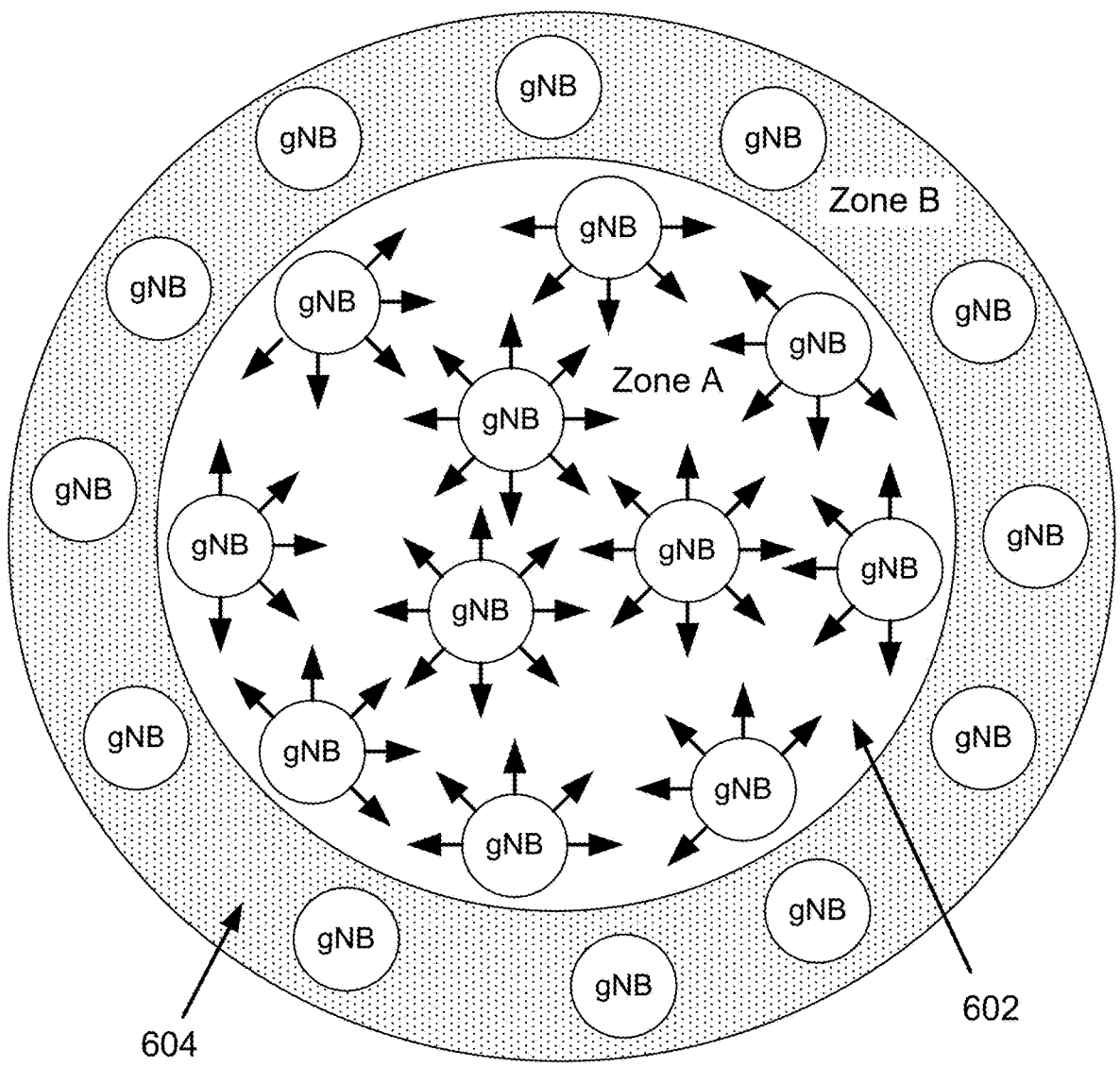
FIG. 6 is a diagram of a zoning technique in which transmission by gNBs at the periphery of an area is directed within the area to prevent interference during increased PRS transmission in a wireless network.

A third option (referred to as "Option 3") to avoid or reduce additional interference is to restrict increased PRS transmission to directional PRS beams and/or use lower power for the increased PRS transmission, such that additional interference from the increased PRS transmission will not be significant outside the target area of increased PRS transmission. For example, in the case of directional PRS transmission, gNBs 110 that are well inside the target area of increased PRS transmission can transmit increased PRS omni-directionally, whereas gNBs 110 at or near the periphery of the target area can transmit increased PRS only within the target area and not outside the target area, by increasing PRS transmission only for PRS beams directed into the target area (and not for PRS beams directed outside the target area). FIG. 6, by way of example, illustrates a zone A, which is a target area 602 of increased PRS transmission directed within the area, and a surrounding zone B that is an area 604 with normal PRS transmission. In FIG. 6, arrows represent a direction of increased PRS transmission from a gNB.

Option 1 as described above may allow for increased PRS transmission but only over a whole network. Thus, for example, increased PRS transmission could be efficiently correlated with an increase in the overall average demand for PRS measurements (e.g. an increase in the number of UEs being positioned at any one time) but not with an increase in demand that is purely local such as at a sports stadium or convention center, where there may be a high local demand that may not be reflected elsewhere in a network. Option 1 may be suitable for LMF control because an LMF can coordinate change in PRS over a whole network. However, Option 1 may not be suitable for gNB control because each gNB is typically only aware of PRS demand in its own local area and can only coordinate change in PRS transmission over a small area of interconnected gNBs.

Option 2, e.g., as illustrated in FIGS. 4 and 5, allows for localized change of PRS transmission over a small area and may thus be suitable for both LMF control and gNB control. However, there may be conflicts when increased PRS transmission is needed in several nearby areas A1, A2, A3, etc. whose corresponding buffer zones B1, B2, B3 etc. overlap with other areas (e.g. with A1 and B2 overlapping). In addition, different nearby gNBs may request increased PRS transmission within the same area or within overlapping areas at similar times, which could increase the complexity of synchronizing the increases in PRS transmission. Such conflicting requests could be reconciled by a central element such as an LMF which is aware of all the requests as shown in the example in FIG. 5, where separate overlapping areas of increased PRS transmission are combined into one larger area with one combined surrounding buffer zone. For these reasons, Option 2 may not be suitable for gNB control. Option 2 may be used for LMF control because an LMF can ensure that areas of increased PRS transmission and corresponding buffer zones are not in conflict. For example, Option 2 could be used to support increased PRS transmission for a sports stadium, shopping mall or convention center without requiring increased PRS transmission throughout an entire network as in Option 1.

Option 3, e.g., as illustrated in FIG. 6, may be suitable for both LMF control and gNB control because increased PRS transmission may be supported using the example procedures in FIGS. 2 and 3 without needing to consider gNBs whose PRS transmission is not increased. In the case of gNB control, requests from different nearby gNBs to increase PRS transmission by the same gNBs at different times could be supported by requiring each gNB to transmit increased PRS so long as increased PRS is needed for at least one served or camped-on UE or for at least one other gNB.

Figure 7:
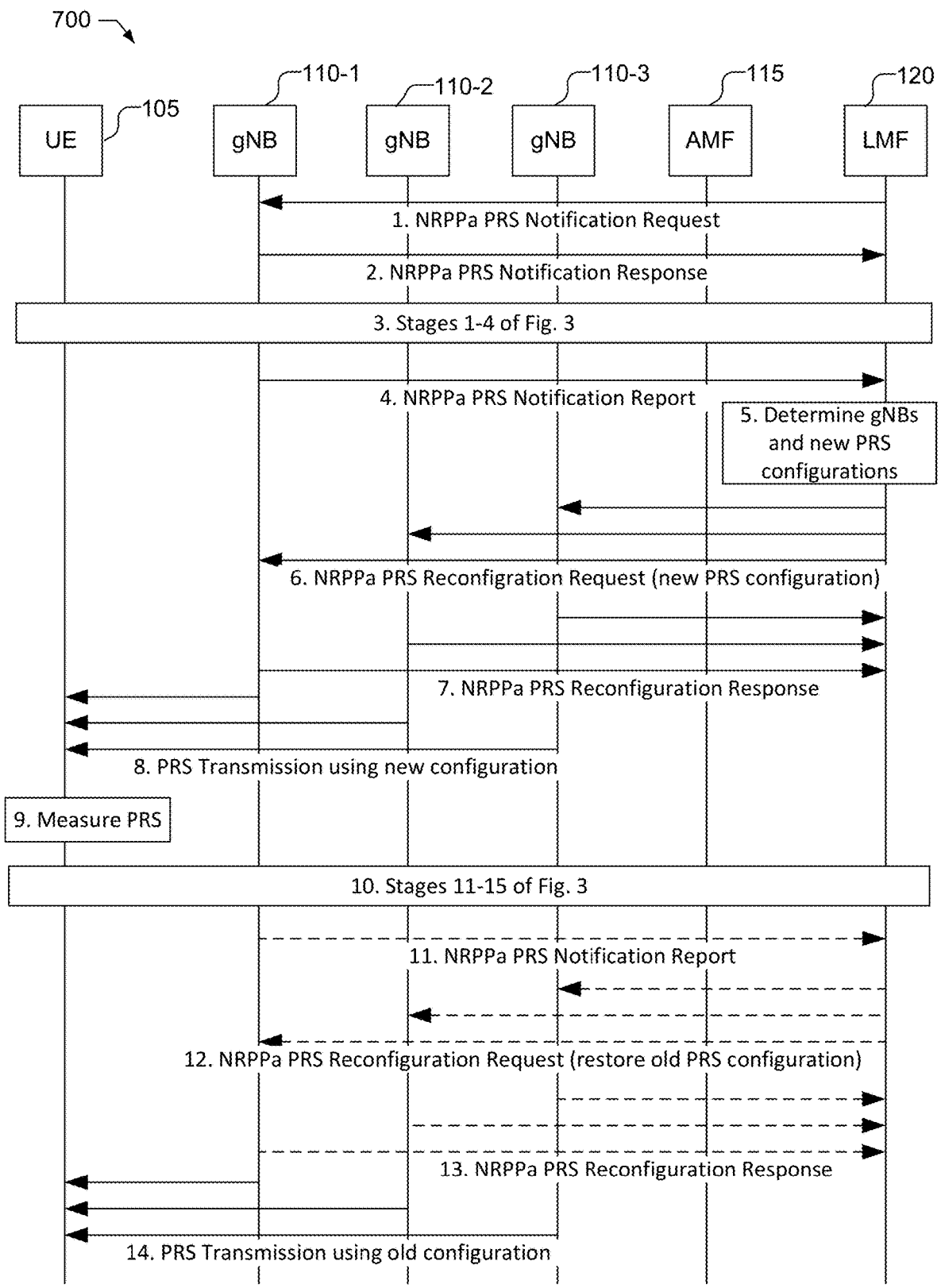
FIG. 7 is a signaling flow showing messages sent between components of a communication network with a combined LMF and gNB control of PRS transmissions.

FIG. 7 shows a signaling flow 700 illustrating messages communicated between various components of the communication system 100 of FIGS. 1A and 1B with enhanced LMF control of DL PRS transmission. The procedure illustrated in FIG. 7 combines aspects of the procedures from FIGS. 2 and 3, to obtain the advantages of both LMF control and gNB control of on demand PRS transmission. While the signaling flow diagram 700 is discussed, for ease of illustration, in relation to 5G NR wireless access using gNBs 110, signaling flows similar to FIG. 7 involving ng-eNBs 114, eNBs or TPs rather than gNBs 110 will be readily apparent to those with ordinary skill in the art. In FIG. 7 (as in FIGS. 2 and 3), one or more of the gNBs 110 could each be replaced by a TP 111 or a TRP. In addition or instead, in some embodiments, LMF 120 in FIG. 7 may be replaced by an LMC 117.

At stage 1 in FIG. 7, the LMF 120 sends an NRPPa PRS Notification Request to gNB 110-1 to request subsequent notification of a need for increased PRS transmission. The request may include a duration of notification reporting, criteria for sending a notification as at stage 4 and a minimum interval between successive notifications.

At stage 2, gNB 110-1 sends an acknowledgment of the request in stage 1 to the LMF 120. Stages similar to stages 1-2 may occur for other gNBs 110 (e.g. gNBs 110-2 and 110-3).

At stage 3, one or more of stages 1-4 of FIG. 3 are performed.

At stage 4 in FIG. 7, based on the request in stage 3 for FIG. 3 (when this stage occurs) or on the requirements for the location procedure in stage 4 for FIG. 3 (when this stage occurs), and the criteria provided in stage 1 (in FIG. 7) for sending a notification, gNB 110-1 sends an NRPPa PRS Notification Report to the LMF 120 to request increased PRS transmission and may include preferred or supported PRS configurations and possibly a preferred number of gNBs. In some cases, gNB 110-1 may wait to determine a need for increased PRS transmission for additional UEs and may combine the notification for all UEs into one NRPPa PRS Notification Report to the LMF 120 which also indicates the number of UEs to which this applies.

At stage 5 in FIG. 7, based on the notification in stage 4 and possibly on the capabilities of gNBs 110 to support increased transmission of PRS (e.g. which may be configured in LMF 120 or requested by LMF 120 from each gNB 110), the LMF 120 determines gNBs 110 (e.g. gNBs 110-1, 110-2 and 110-3 in FIG. 7) to which increased PRS transmission applies and a new PRS configuration for each of the gNBs 110. The LMF 120 may determine a new PRS configuration for a gNB 110 when the LMF 120 is aware of (e.g. is configured with) a normal default "old" PRS configuration for the gNB 110 and determines that an increase in PRS transmission from this gNB 110 is needed. The LMF 120 may also determine a PRS configuration for a gNB 110 when the LMF 120 is not aware of (e.g. is not configured with) a normal default "old" PRS configuration for the gNB 110 and determines that a particular level of PRS transmission from this gNB 110 is needed. In either case, the PRS configuration that is determined for a gNB 110 is referred to herein as a "new PRS configuration"

The determination at stage 5 may also be based on other NRPPa PRS Notification Reports received from other gNBs 110 (e.g. gNBs 110-2 and 110-3) at about the same time. The new PRS configuration for each gNB 110 may use increased PRS bandwidth, a longer duration of PRS positioning occasions, PRS transmission on new frequencies, and/or a higher frequency of PRS positioning occasions and may, in some cases, be selected from a set of one or more preconfigured sets of PRS configuration parameters to support increased PRS transmission. In the case of support for directional PRS beams, the LMF 120 may determine directional PRS beams for each gNB 110 which should be received by any target UE 105, and may provide a new PRS configuration only for these directional PRS beams. The directional PRS beams may be selected by the LMF 120 according to known approximate locations for target UEs, e.g. as given by the coverage area of each gNB 110 which requests an increase in PRS transmission.

At stage 6, the LMF 120 sends an NRPPa PRS Reconfiguration Request message to each of the gNBs 110 determined at stage 5 and includes the new PRS configuration determined for that gNB 110. The request may also include a start time for each new PRS configuration and/or a duration and may include the PRS configurations and the identities for some or all of the gNB s 110 determined at stage 5 so that each gNB 110 can correctly include the PRS configurations for these gNBs 110 in SI messages sent at stage 8.

At stage 7, each of the gNBs 110 returns a response to the LMF 120 indicating whether the new PRS configuration can be supported (or is now being transmitted). If some gNBs 110 indicate that a new PRS configuration cannot be supported, the LMF 120 may perform stages 12 and 13 to restore the old PRS configuration in each of the gNBs 110 which indicated a new PRS configuration can be supported in order to avoid interference between gNBs 110 which support the new PRS configuration and gNB s 110 which do not. In one embodiment, if a gNB 110 is not able to support the requested new PRS configuration (e.g. due to a lack of resources at the current time), it may provide a list of possible alternative PRS configurations in the response at stage 7 or may switch to transmitting some other new PRS configuration that supports increased PRS transmission and indicate this new PRS configuration at stage 7. The LMF 120 may then repeat stages 6 and 7 for some or all of the determined gNBs 110 with different new PRS configurations.

At stage 8, each of the gNBs 110 which acknowledged support of a new PRS configuration at stage 7 changes from an old PRS configuration to the new PRS configuration either after (or just before) sending the acknowledgment at stage 7 if no start time was provided or at the start time indicated in stage 6. In some cases, the old PRS configuration may correspond to not transmitting a DL PRS. Each gNB 110 may also provide an indication of the new PRS configuration for itself and one or more nearby gNBs 110 (e.g. as provided by the LMF 120 at stage 6) in SI messages (e.g. positioning SI messages) which are broadcast to all nearby served or camped-on UEs to enable the nearby UEs to become aware of the new PRS configurations.

At stage 9, the UE 105 acquires and measures the PRS transmitted by one or more gNBs 110 at stage 8 according to the new PRS configurations. For example the UE 105 may obtain RSTD measurements when OTDOA is used, TOA or Rx-Rx measurements when RTT is used, or AOA or RSRP measurements when AOA or AOD is used. The UE 105 may determine the new PRS configurations from SI messages transmitted by a serving or camped-on gNB 110 (e.g. gNB 110-1) or from an RRC message sent by a serving gNB 110-1 as part of a location procedure between the UE 105 and serving gNB 110-1.

At stage 10 in FIG. 7, one or more of stages 11-15 of FIG. 3 are performed

At stage 11 in FIG. 7, when increased PRS transmission is no longer needed by gNB 110-1 and if the criteria received in stage 1 allow for notification of this to the LMF 120, gNB 110-1 sends an NRPPa PRS Notification Report to the LMF 120 to indicate that the old PRS configurations can be restored.

At stage 12, based on the notification received at stage 11 and possibly on similar notifications received from other gNBs 110 (e.g. gNBs 110-2 and 110-3) and if a duration was not included at stage 6, the LMF 120 may send an NRPPa PRS Reconfiguration Request message to each of the gNBs 110 which acknowledged a new PRS configuration at stage 7 and includes a request to restore the old PRS configuration for each gNB 110.

At stage 13, each of the gNBs 110 may return a response to the LMF 120 indicating whether the old PRS configuration can be restored.

At stage 14, each of the gNBs 110 begins transmitting the old PRS configuration when the duration received in stage 6 expires or after receiving and acknowledging the request to restore the old PRS configuration at stages 12 and 13.

The procedure shown in FIG. 7 is mostly a superset of the procedure for LMF 120 control shown in FIG. 2, which means that an LMF 120 and gNBs 110 could efficiently support both procedures. The advantages of both procedures can include the ability to coordinate increased PRS transmission over multiple gNBs 110 more flexibly than gNB control (as shown by the evaluation of Options 1, 2 and 3 above), the ability to increase PRS transmission in advance of requesting PRS measurements from a UE 105 by an LMF 120, the ability to support UE based positioning for UEs caused by a request from an internal UE client, and the ability to respond to a UE request for increased PRS transmission with low latency (though higher latency than with gNB control).

Figure 8:
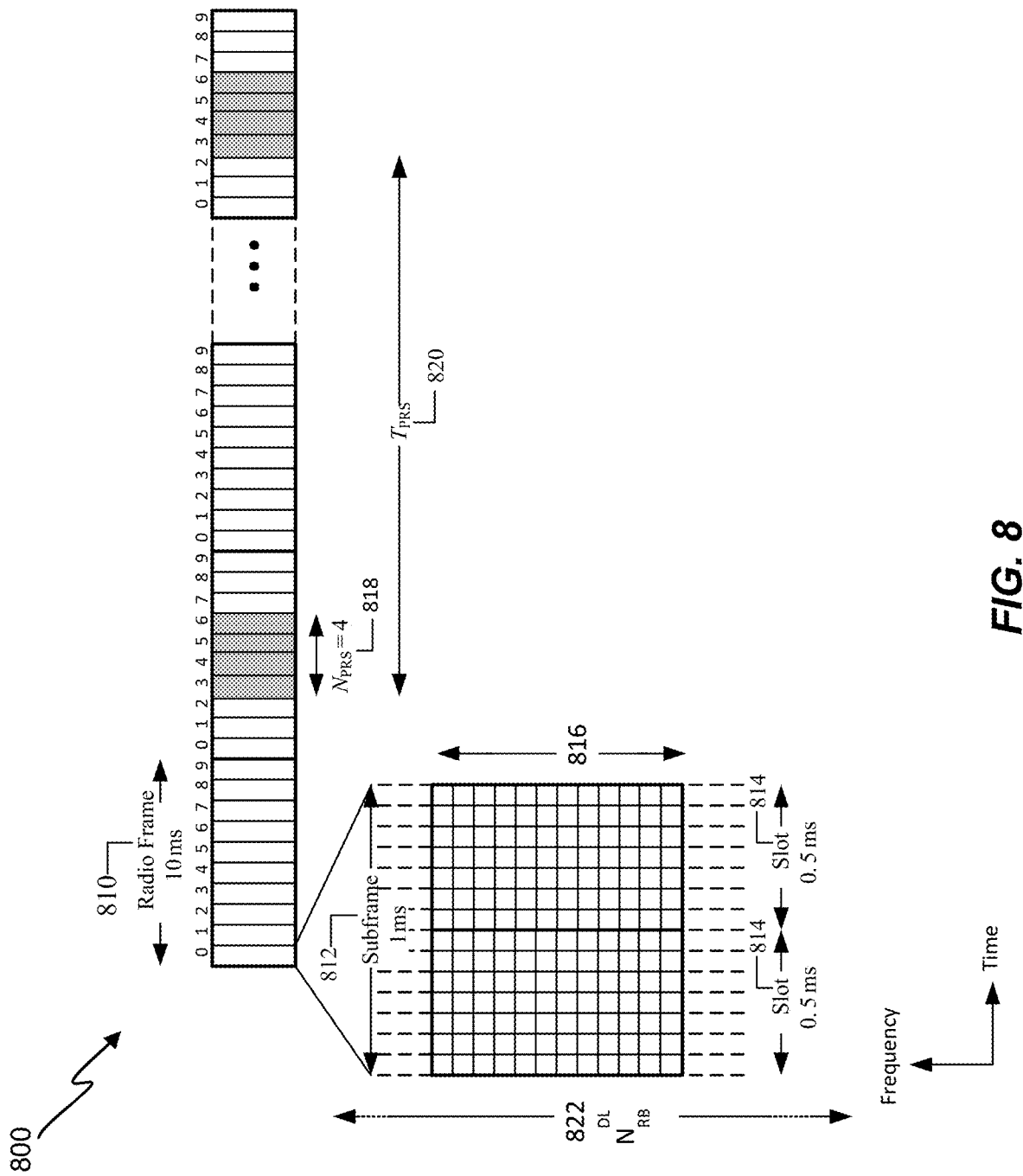
FIG. 8 is a diagram of a structure of an example LTE subframe sequence with PRS positioning occasions.

FIG. 8 shows a structure of an example LTE subframe sequence 800 with PRS positioning occasions. While FIG. 8 provides an example of a subframe sequence for LTE in association with an EPS, similar or identical subframe sequence implementations may be realized for other communication technologies/protocols, such as 5G NR. For example, support of PRS transmission by a gNB 110 or ng-eNB 114 in communication system 100 may be similar or identical to that described for LTE in an EPS with reference to FIGS. 8 and 9. In FIG. 8, time is represented horizontally (e.g., on an X axis) with time increasing from left to right, while frequency is represented vertically (e.g., on a Y axis) with frequency increasing (or decreasing) from bottom to top. As shown in FIG. 8, downlink and uplink LTE Radio Frames 810 may be of 10 milliseconds (ms) duration each. For downlink Frequency Division Duplexing (FDD) mode, Radio Frames 810 are organized, in the illustrated embodiments, into ten subframes 812 of 1 ms duration each. Each subframe 812 comprises two slots 814, each of, for example, 0.5 ms duration.

In the frequency domain, the available bandwidth may be divided into uniformly spaced orthogonal subcarriers 816. For example, for a normal length cyclic prefix using, for example, 15 kHz spacing, subcarriers 816 may be grouped into a group of twelve (12) subcarriers. Each grouping, which comprises the 12 subcarriers 816, is termed a resource block and, in the example above, the number of subcarriers in the resource block may be written as $N_{SC}^{RB}=12$. For a given channel bandwidth, the number of available resource blocks on each channel 822, which is also called the transmission bandwidth configuration 822, is indicated as NB. For example, for a 3 MHz channel bandwidth in the above example, the number of available resource blocks on each channel 822 is given by $N_{RB}^{DL}=15$.

In the communication system 100 illustrated in FIGS. 1A and 1B, a gNB 110, such as any of the gNBs 110-1, 110-2, or 110-3, or an ng-eNB 114 may transmit frames, or other physical layer signaling sequences, supporting PRS signals (i.e. a downlink (DL) PRS) according to frame configurations similar or identical to that shown in FIG. 8 and (as described later) in FIG. 9, which may be measured and used for UE (e.g., UE 105) position determination. As noted, other types of wireless nodes and base stations may also be configured to transmit PRS signals configured in a manner similar to that depicted in FIGS. 8 and 9. Since transmission of a PRS by a wireless node or base station is directed to all UEs within radio range, a wireless node or base station can also be considered to transmit (or broadcast) a PRS.

A PRS, which has been defined in 3GPP LTE Release-9 and later releases, may be transmitted by wireless nodes (e.g. eNBs) after appropriate configuration (e.g., by an Operations and Maintenance (O&M) server). A PRS may be transmitted in special positioning subframes (also referred to as PRS subframes) that are grouped into positioning occasions (also referred to as PRS positioning occasions). For example, in LTE, a PRS positioning occasion can comprise a number $N_{PRS}$ of consecutive positioning subframes where the number $N_{PRS}$ may be between 1 and 160 (e.g. may include the values 1, 2, 4 and 6 as well as other values). The PRS positioning occasions for a cell supported by a wireless node may occur periodically at intervals, denoted by a number $T_{PRS}$, of millisecond (or subframe) intervals where $T_{PRS}$ may equal 5, 10, 20, 40, 80, 160, 320, 640, or 1280 (or any other appropriate value). As an example, FIG. 8 illustrates a periodicity of positioning occasions where $N_{PRS}$ 818 equals 4 and $T_{PRS}$ 820 is greater than or equal to 20. In some embodiments, $T_{PRS}$ may be measured in terms of the number of subframes between the start of consecutive positioning occasions.

Within each positioning occasion, a PRS may be transmitted with a constant power. A PRS can also be transmitted with zero power (i.e., muted). Muting, which turns off a regularly scheduled PRS transmission, may be useful when PRS signals between different cells overlap by occurring at the same or almost the same time. In this case, the PRS signals from some cells may be muted while PRS signals from other cells are transmitted (e.g. at a constant power). Muting may aid signal acquisition and RSTD measurement, by UEs (such as the UE 105 depicted in FIGS. 1A-3), of PRS signals that are not muted (by avoiding interference from PRS signals that have been muted). Muting may be viewed as the non-transmission of a PRS for a given positioning occasion for a particular cell. Muting patterns may be signaled (e.g. using LPP or NPP) to a UE 105 using bit strings. For example, in a bit string signaling a muting pattern, if a bit at position j is set to '0', then the UE 105 may infer that the PRS is muted for a $j^{th}$ positioning occasion.

To further improve hearability of PRS, positioning subframes may be low-interference subframes that are transmitted without user data channels. As a result, in ideally synchronized networks, PRSs may receive interference from other cell PRSs with the same PRS pattern index (i.e., with the same frequency shift), but not from data transmissions. The frequency shift, in LTE, for example, is defined as a function of a PRS ID (denoted as $N_{ID}^{PRS}$) for a cell or Transmission Point (TP) or as a function of a Physical Cell Identifier (PCI) (denoted as $N_{ID}^{cell}$) if no PRS ID is assigned, which results in an effective frequency re-use factor of 6, as described in 3GPP TS 36.211.

To also improve hearability of a PRS (e.g., when PRS bandwidth is limited such as with only 6 resource blocks corresponding to 1.4 MHz bandwidth), the frequency band for consecutive PRS positioning occasions (or consecutive PRS subframes) may be changed in a known and predictable manner via frequency hopping. In addition, a cell supported by a wireless node may support more than one PRS configuration, where each PRS configuration comprises a distinct sequence of PRS positioning occasions with a particular number of subframes ($N_{PRS}$) per positioning occasion and a particular periodicity ($T_{PRS}$) Further enhancements of a PRS may also be supported by a wireless node.

In some embodiments, assistance data (e.g. for OTDOA) may be provided to a UE 105 by a location server (e.g., the LMF 120 or SLP 129 of FIG. 1A, an E-SMLC, etc.) for a "reference cell" and one or more "neighbor cells" or "neighboring cells" relative to the "reference cell." For example, the assistance data may provide the center channel frequency of each cell, various PRS configuration parameters (e.g., $N_{PRS}$, $T_{PRS}$, muting sequence, frequency hopping sequence, code sequence, PRS ID, PRS bandwidth), a cell global ID, and/or other cell related parameters applicable to OTDOA or some other positioning procedure.

PRS-based positioning by a UE 105 may be facilitated by indicating the serving cell for the UE 105 in the assistance data (e.g. with the reference cell indicated as being the serving cell). In the case of a UE 105 with 5G NR wireless access, the reference cell may be chosen by the LMF 120 as some cell with good coverage at the expected approximate location of the UE 105 (e.g., as indicated by the known 5G NR serving cell for the UE 105).

In some embodiments, assistance data (e.g. for OTDOA) may also include "expected RSTD" parameters, which provide the UE 105 with information about the RSTD values the UE 105 is expected to measure at its current location between the reference cell and each neighbor cell, together with an uncertainty of the expected RSTD parameter. The expected RSTD, together with the associated uncertainty, define a search window for the UE 105 within which the UE 105 is expected to measure the RSTD value. Assistance information may also include PRS configuration information parameters, which allow a UE 105 to determine when a PRS positioning occasion occurs on signals received from various neighbor cells relative to PRS positioning occasions for the reference cell, and to determine the PRS sequence transmitted from various cells in order to measure a signal Time of Arrival (TOA) or RSTD.

Using the PRS measurements obtained by a UE 105 (e.g. measurements of RSTD, Rx-Tx, RSRP and/or TOA), the known absolute or relative transmission timing of each cell, the directions of PRS transmission when directed PRS beams are transmitted, and/or the known position(s) of wireless node physical transmitting antennas for the reference and neighboring cells, the UE 105's position may be calculated (e.g., by the UE 105, by the LMF 120, or by some other node). For example, in the case of OTDOA, the RSTD for a cell "k" relative to a reference cell "Ref", may be given as $(TOA_k - TOA_{Ref})$. TOA measurements for different cells may then be converted to RSTD measurements (e.g. as defined in 3GPP TS 36.214 entitled "Physical layer; Measurements") and sent to the location server (e.g., the LMF 120 or an E-SMLC) by the UE 105. Using (i) the RSTD measurements, (ii) the known absolute or relative transmission timing of each cell, and (iii) the known position(s) of physical transmitting antennas for the reference and neighboring cells, the UE 105's position may be determined using multilateration techniques. In the case of AOD, RSRP measurements by a UE 105 may be used to identify PRS beams that are directed at the location of the UE 105 from two or more gNBs 110, enabling the location of UE 105 to be obtained using triangulation techniques.

Figure 9:
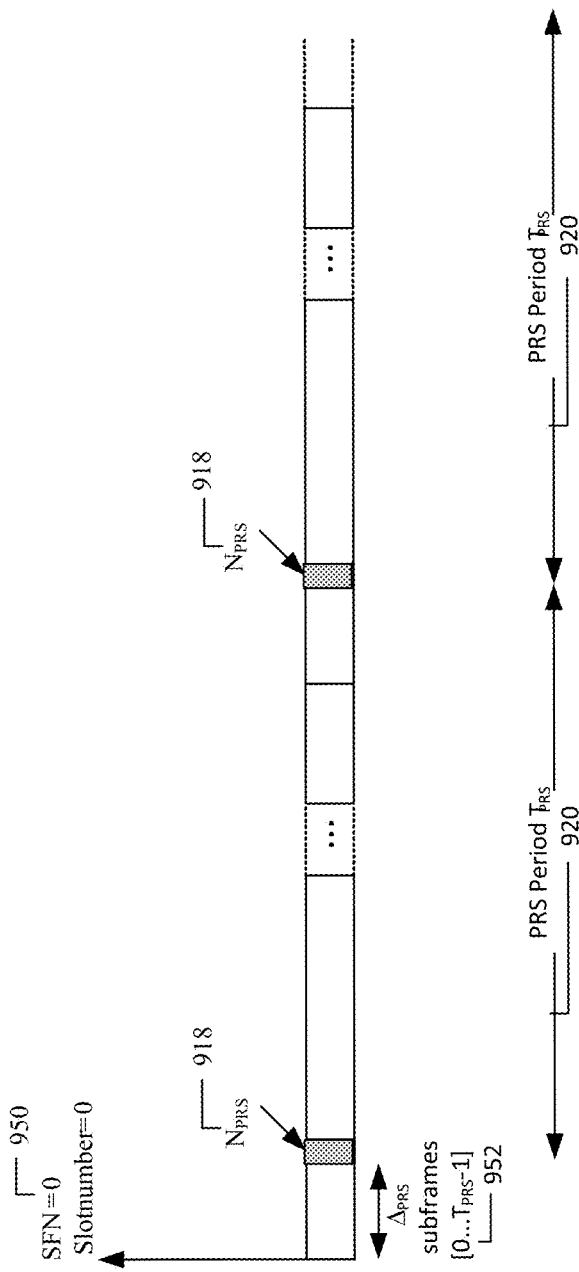
FIG. 9 is a diagram illustrating further aspects of PRS transmission for a cell supported by a wireless node.

FIG. 9 illustrates further aspects of PRS transmission for a cell supported by a wireless node (such as an eNB, gNB 110 or ng-eNB 114). Again, PRS transmission for LTE in an EPS is assumed in FIG. 9 although the same or similar aspects of PRS transmission to those shown in and described for FIG. 9 may apply to 5G NR support by a gNB 110, LTE support by an ng-eNB 114 and/or other wireless technologies. FIG. 9 shows how PRS positioning occasions are determined by a System Frame Number (SFN), a cell specific subframe offset ($\Delta_{PRS}$) and the PRS Periodicity ($T_{PRS}$) 920. Typically, the cell specific PRS subframe configuration is defined by a "PRS Configuration Index" $I_{PRS}$ included in the assistance data (e.g. for OTDOA). The PRS Periodicity ($T_{PRS}$) 920 and the cell specific subframe offset ($\Delta_{PRS}$) are defined based on the PRS Configuration Index $I_{PRS}$, in 3GPP TS 36.211 entitled "Physical channels and modulation," as illustrated in Table 1 below.

TABLE 1

| PRS configuration Index $I_{PRS}$ | PRS periodicity $T_{PRS}$ (subframes) | PRS subframe offset $\Delta_{PRS}$ (subframes) |
|---|---|---|
| 0–159 | 160 | $I_{PRS}$ |
| 160–479 | 320 | $I_{PRS}$ − 160 |
| 480–1119 | 640 | $I_{PRS}$ − 480 |
| 1120–2399 | 1280 | $I_{PRS}$ − 1120 |
| 2400–2404 | 5 | $I_{PRS}$ − 2400 |
| 2405–2414 | 10 | $I_{PRS}$ − 2405 |
| 2415–2434 | 20 | $I_{PRS}$ − 2415 |
| 2435–2474 | 40 | $I_{PRS}$ − 2435 |
| 2475–2554 | 80 | $I_{PRS}$ − 2475 |
| 2555–4095 | Reserved | |

A PRS configuration is defined with reference to the System Frame Number (SFN) of a cell that transmits PRS. PRS instances, for the first subframe of the $N_{PRS}$ downlink subframes comprising a first PRS positioning occasion, may satisfy:

$$(10 \times n_f + \lfloor n_s/2 \rfloor - \Delta_{PRS}) \bmod T_{PRS} = 0 \quad (1)$$

where $n_f$ is the SFN with $0 \leq n_f \leq 1023$, $n_s$ is the slot number within the radio frame defined by $n_f$ with $0 \leq n_s \leq 19$, $T_{PRS}$ is the PRS periodicity, and $\Delta_{PRS}$ is the cell-specific subframe offset.

As shown in FIG. 9, the cell specific subframe offset $\Delta_{PRS}$ 952 may be defined in terms of the number of subframes transmitted starting from System Frame Number 0 (Slot 'Number 0', marked as slot 950) to the start of the first (subsequent) PRS positioning occasion. In FIG. 9, the number of consecutive positioning subframes 918 ($N_{PRS}$) equals 4.

In some embodiments, when a UE 105 receives a PRS configuration index $I_{PRS}$ in the assistance data for a particular cell, the UE 105 may determine the PRS periodicity $T_{PRS}$ and PRS subframe offset $\Delta_{PRS}$ using Table 1. The UE 105 may then determine the radio frame, subframe and slot when a PRS is scheduled in the cell (e.g., using equation (1)). The assistance data may be determined by, for example, the LMF 120 or an E-SMLC and includes assistance data for a reference cell, and a number of neighbor cells supported by various wireless nodes (e.g. eNBs, gNBs 110 or ng-eNBs 114).

Typically, PRS occasions from all cells in a network that use the same frequency are aligned in time and may have a fixed known time offset relative to other cells in the network that use a different frequency. In SFN-synchronous networks all wireless nodes (gNBs 110, ng-eNBs 114, eNBs, etc.) may be aligned on both frame boundary and system frame number. Therefore, in SFN-synchronous networks all cells supported by the various wireless nodes may use the same PRS configuration index for any particular frequency of PRS transmission. On the other hand, in SFN-asynchronous networks, the various wireless nodes may be aligned on a frame boundary, but not system frame number. Thus, in SFN-asynchronous networks the PRS configuration index for each cell may be configured separately by the network so that PRS occasions align in time.

A UE 105 may determine the timing of the PRS occasions (e.g., in an LTE network or a 5G NR network such as that in communication system 100) of the reference and neighbor cells for positioning (e.g. using OTDOA, RTT and/or AOD), if the UE 105 can obtain the cell timing (e.g., SFN or Frame Number) of at least one of the cells, e.g., the reference cell or a serving cell (which may be performed at stage 10 of FIG. 2, or stage 10 of FIG. 3). The timing of the other cells may then be derived by the UE 105 based, for example, on the assumption that PRS occasions from different cells overlap.

As defined by 3GPP (e.g., in 3GPP TS 36.211), for LTE systems, the sequence of subframes used to transmit PRS (e.g., for OTDOA, RTT or AOD positioning) may be characterized and defined by a number of parameters, as described previously, comprising: (i) a reserved block of bandwidth (BW); (ii) the configuration index $I_{PRS}$; (iii) the duration $N_{PRS}$; (iv) an optional muting pattern; and (v) a muting sequence periodicity $T_{REP}$ which can be implicitly included as part of the muting pattern in (iv) when present. In some cases, with a fairly low PRS duty cycle, $N_{PRS}=1$, $T_{PRS}=160$ subframes (equivalent to 160 ms), and BW=1.4, 3, 5, 10, 15 or 20 MHz. To increase the PRS duty cycle, the $N_{PRS}$ value can be increased to six (i.e., $N_{PRS}$=6) and the bandwidth (BW) value can be increased to the system bandwidth (i.e., BW=LTE system bandwidth in the case of LTE). An expanded PRS with a larger $N_{PRS}$ (e.g., greater than six) and/or a shorter $T_{PRS}$ (e.g., less than 160 ms), up to the full duty cycle (i.e., $N_{PRS}=T_{PRS}$), may also be used in later versions of LPP according to 3GPP TS 36.355.

Increasing the resource allocation for PRS when requested by a UE 105 (e.g. as exemplified with respect to FIGS. 1A-7) may be implemented for any cell using one or more of: (i) increasing the PRS bandwidth BW, (ii) increasing the number of subframes $N_{PRS}$ per PRS positioning occasion, (iii) reducing the periodicity $T_{PRS}$ between consecutive positioning occasions, (iv) increasing the number of separate PRS configurations supported in the cell, and (v) a transmission of PRS using an uplink carrier frequency.

Figure 10:
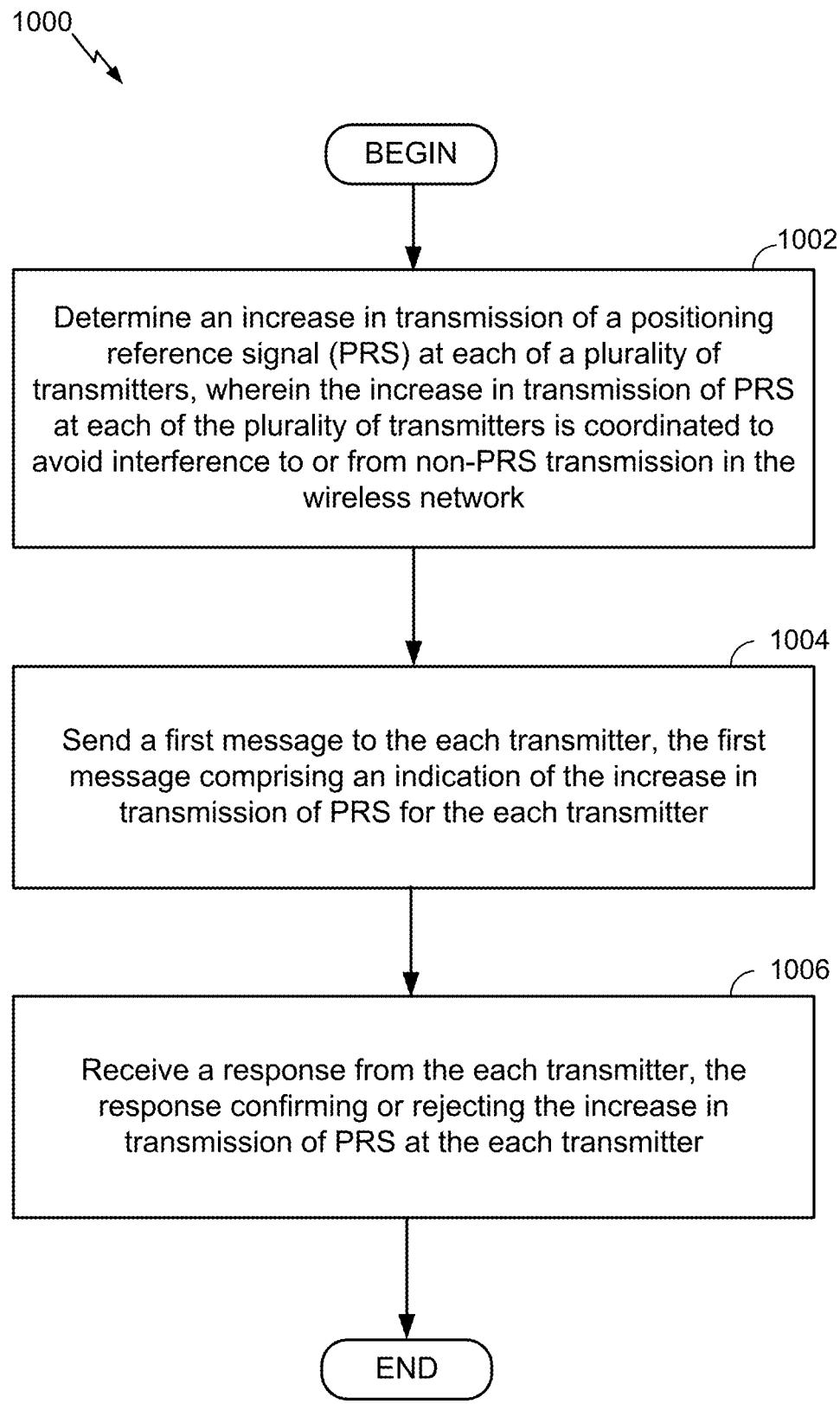
FIG. 10 is a flowchart of an example procedure to control PRS transmissions.

FIG. 10 shows a flowchart of an example procedure 1000 for supporting location of a user equipment (UE) such as the UE 105 in FIGS. 1A-1B. The procedure 1000 may be performed by an entity in a wireless network, such as by: (i) a server, such as LMF 120, shown in FIGS. 1A-1B; or (ii) a base station, such as a gNB 110 or ng-eNB 114, shown in FIGS. 1A-1B, or an eNB; or (iii) an LMC such as LMC 117 shown in FIG. 1B, where the entity may be configured to transmit radio signals, e.g., according to LTE, 5G or NR protocols.

As illustrated, at block 1002, the entity determines an increase in transmission of a positioning reference signal (PRS) at each of a plurality of transmitters, where the increase in transmission of PRS at each of the plurality of transmitters is coordinated by the entity to avoid interference to or from non-PRS transmission in the wireless network, e.g., as illustrated at stage 4 in FIG. 2, stage 5 in FIG. 3, or stage 5 in FIG. 7.

At block 1004, the entity sends a first message to the each transmitter, the first message comprising an indication of the increase in transmission of PRS for the each transmitter, e.g., as illustrated at stage 5 in FIG. 2, stage 6 in FIG. 3 or stage 6 in FIG. 7.

At block 1006, the entity receives a response from the each transmitter, the response confirming or rejecting the increase in transmission of PRS at the each transmitter, e.g., as illustrated at stage 6 in FIG. 2, stage 7 in FIG. 3 or stage 7 in FIG. 7.

In one aspect, the entity may be a location server or location server function, e.g., LMF 120 or LMC 117. In this aspect, the entity may further receive location requests (e.g. from one or more AMFs such as AMF 115) for a plurality of one or more UEs, where the determining an increase in transmission of a PRS at each of the plurality of transmitters is based on the location requests, and the entity may send a second message to each UE in the plurality of one or more UEs, where the second message requests measurements by the each UE of at least one PRS with increased transmission from at least one transmitter, as illustrated in stages 8 and 9 of FIG. 2. The entity may further receive notification reports from a plurality of base stations (e.g. gNBs such as gNBs 110), where the notification report from each base station in the plurality of base stations requests an increase in PRS transmission for the each base station, where determining an increase in transmission of a positioning reference signal (PRS) at each of the plurality of transmitters is based on the notification report, and where the plurality of base stations comprises or is a subset of the plurality of transmitters, as illustrated in stage 4 of FIG. 7.

In one aspect, the entity may be a base station, e.g., gNB 110 or ng-eNB 114, shown in FIGS. 1A-1B, or an eNB. In this aspect, the entity may receive requests for increased PRS from a plurality of one or more UEs, where determining an increase in transmission of a positioning reference signal (PRS) at each of the plurality of transmitters is based on the requests for increased PRS, and where the plurality of transmitters comprises or includes the entity, as illustrated in stages 3-5 of FIG. 3. The requests, for example, may comprise requests for a random access procedure or Radio Resource Control (RRC) messages or both. The entity may further receive requests for location of a plurality of one or more UEs (e.g. from some UEs in the plurality and/or from AMFs, LMFs and/or LMCs), where determining an increase in transmission of a positioning reference signal (PRS) at each of the plurality of transmitters is based on the requests for location, and where the plurality of transmitters comprises or includes the entity, as illustrated in stages 3 and 5 of FIG. 3. Additionally, the entity may send a second message to each UE in the plurality of one or more UEs, where the second message requests measurements by the each UE of at least one PRS with increased transmission from at least one transmitter, e.g. as part of a location procedure with the each UE such as that for stage 4 in FIG. 3.

In one aspect, the coordination to avoid interference to or from non-PRS transmission in the wireless network comprises determining an area of increased PRS transmission, where the increase in transmission of PRS at each of the plurality of transmitters comprises an increase in transmission of a plurality of directional PRSs at each of the plurality of transmitters, and where the plurality of directional PRSs comprise PRS beams directed inside the area and exclude PRS beams directed outside the area, e.g., as illustrated in FIG. 6.

In one aspect, the plurality of transmitters comprises a plurality of base stations (e.g. gNBs 110, ng-eNBs 114 and/or eNBs), a plurality of PRS only beacons, a plurality of remote radio heads, a plurality of TPs 111, and/or a plurality of TRPs as described for FIG. 1B, or some combination of these.

Figure 11:
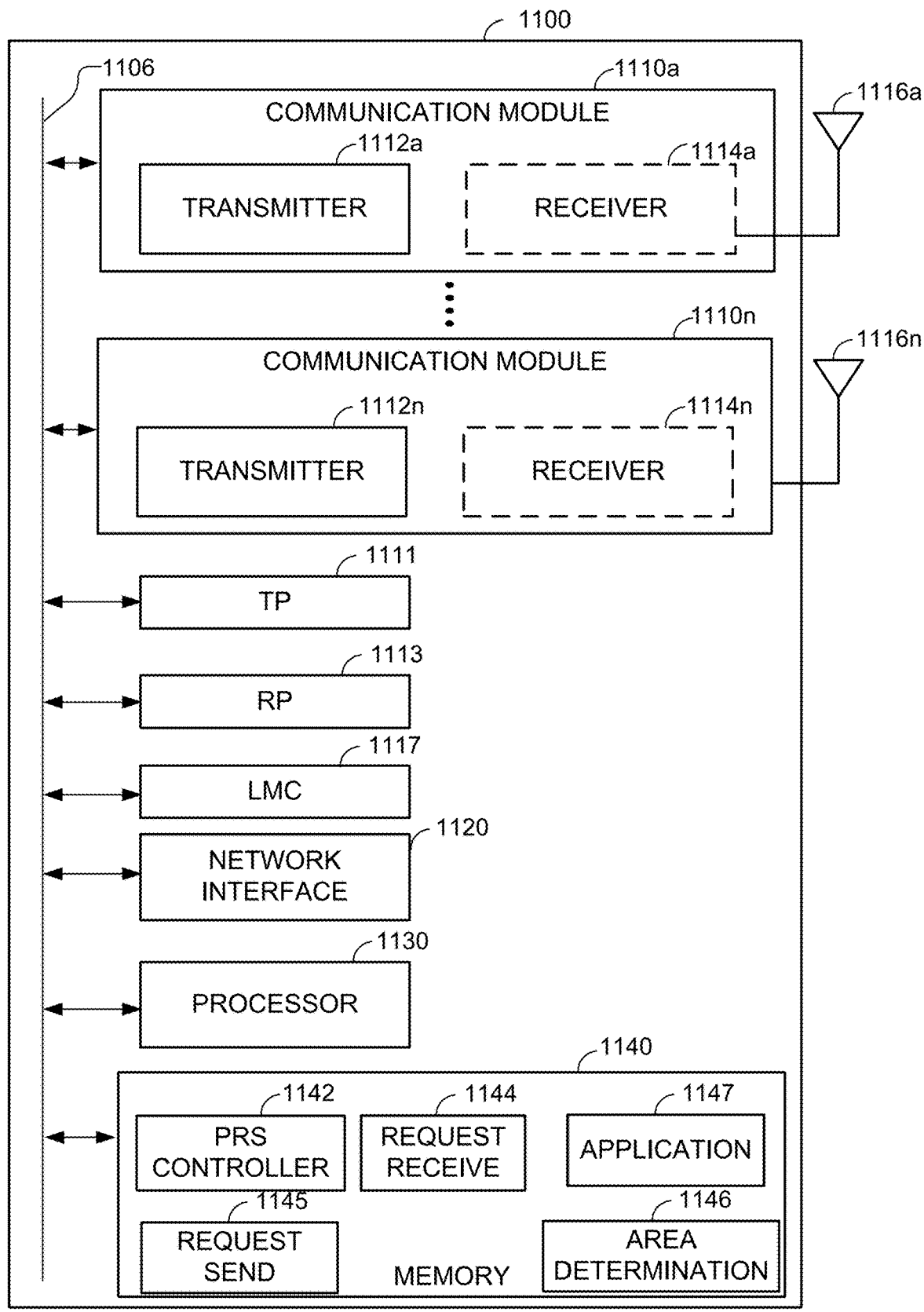
FIG. 11 is a block diagram of an embodiment of a base station capable of controlling PRS transmissions.

FIG. 11 shows a schematic diagram of a hardware implementation of a base station 1100, such as a gNB 110, an ng-eNB 114, an eNB, which may be similar to, and be configured to have a functionality similar to that depicted or described, for example, with reference to FIGS. 1A-1B, 2, 3, and 7. The base station 1100 may include one or more communication modules 1110a-n, sometimes referred to as external interfaces, electrically coupled to one more antennas 1116a-n for communicating with wireless devices, such as, for example, the UE 105 of FIGS. 1A-1B. The each of the communication modules 1110a-810n may include a respective transmitter 1112a-n for sending signals (e.g., downlink messages and signals, which may be arranged in frames, and which may include positioning reference signals and/or assistance data whose quantity may be controlled/varied as described herein) and, optionally (e.g., for nodes configured to receive and process uplink communications) a respective receiver 1114a-n. In embodiments in which the implemented node includes both a transmitter and a receiver, the communication module comprising the transmitter and receiver may be referred to as a transceiver. The base station 1100 may also include a network interface 1120 to communicate with other network nodes (e.g., sending and receiving queries and responses). For example, each network element may be configured to communicate (e.g., via wired or wireless backhaul communication) with a gateway, or other suitable device of a network, to facilitate communication with one or more core network nodes (e.g., any of the other nodes and elements shown in FIGS. 1A-1B). Additionally, and/or alternatively, communication with other network nodes may also be performed using the communication modules 1110a-n and/or the respective antennas 1116a-n.

The base station 1100 may also include other components that may be used with embodiments described herein. For example, the base station 1100 may include one or more Transmission Points (TPs) 1111 (e.g. each corresponding to a TP 111 in FIG. 1B), such as remote radio heads, or broadcast-only TPs for improved support of DL related position methods such as OTDOA, RTT, AOD and/or ECID. The base station 1100 may further include one or more Reception Points (RPs) 1113 (e.g. each corresponding to an RP 113 in FIG. 1B), such as remote radio heads or internal Location Measurement Units (LMUs) for UL measurements for position methods such as UTDOA, AOA or ECID. In some cases, a TP 1111 and RP 1113 may be combined into a single TRP. The base station 1100 may further include a Location Management Component (LMC) 1117 (e.g. corresponding to an LMC 117 in FIG. 1B) to support positioning of a target UE.

The base station 1100 may include, in some embodiments, at least one processor 1130 (also referred to as a controller) and memory 1140 to manage communications with other nodes (e.g., sending and receiving messages), to generate communication signals (including to generate communication frames, signals and/or messages with adjustable quantities of resources that are allocated for location-related information such as PRS transmissions and assistance data transmissions), and to provide other related functionality, including functionality to implement the various processes and methods described herein. The one or more processors 1130 and memory 1140 may be coupled together with bus 1106. The one or more processors 1130 and other components of the base station 1100 may similarly be coupled together with bus 1106, a separate bus, or may be directly connected together or coupled using a combination of the foregoing. The memory 1140 may contain executable code or software instructions that when executed by the one or more processors 1130 cause the one or more processors 1130 to operate as a special purpose computer programmed to perform the procedures and techniques disclosed herein (e.g. such as the process flows 1000).

As illustrated in FIG. 11, the memory 1140 includes one or more components or modules that when implemented by the one or more processors 1130 implements the methodologies as described herein. While the components or modules are illustrated as software in memory 1140 that is executable by the one or more processors 1130, it should be understood that the components or modules may be dedicated hardware either in the processor or off processor. As illustrated, the memory 1140 may include a PRS controller 1142 that enables the one or more processors 1130 to determine an increase in transmission of PRS at each of a plurality of transmitters. The PRS controller 1142, for example, coordinates to avoid interference to or from non-PRS transmission in the wireless network. The PRS controller 1142, for example, may enable the one or more processors 1130 to send messages to each transmitter, e.g., via transceiver 1110, indicating the increase in transmission of PRS for the each transmitter, and to enable the one or more processors 1130 to receive, via transceiver 1110, a response from the each transmitter confirming or rejecting the increase in transmission of PRS at the each transmitter. The memory 1140 may include a request receive module 1144 that enables the one or more processors 1130 to receive, via transceiver 1110, requests for increased PRS or for location from UEs, wherein the increase in transmission of PRS is based on the received requests. The memory 1140 may further include a request send module 1145, which enables the one or more processors 1130 to send, via transceiver 1110, messages to UEs requesting measurements of at least one PRS with increased transmission from at least one transmitter. The memory 1140 may further include an area determination module 1146, which enables the one or more processors 1130 to determine an area of increased PRS transmission to avoid interference to or from non-PRS transmission in the wireless network. The memory 1140 may also include an application module 1147 with computer code for various applications required to perform the operations of the base station 1100. For example, the at least one processor 1130 may be configured (e.g., using code provided via the application module 1147, or some other module in the memory 1140) to control the operation of the antennas 1116a-n so as to adjustably control the antennas' transmission power and phase, gain pattern, antenna direction (e.g., the direction at which a resultant radiation beam from the antennas 1116a-n propagates), antenna diversity, and other adjustable antenna parameters for the antennas 1116a-n of the base station 1100. In some embodiments, the antennas' configuration may be controlled according to pre-stored configuration data provided at the time of manufacture or deployment of the base station 1100, or according to data obtained from a remote device (such as a central server sending data representative of the antenna configuration, and other operational parameters, that are to be used for the base station 1100). The base station 1100 may also be configured, in some implementations, to perform location data services, or performs other types of services, for multiple wireless devices (clients) communicating with the base station 1100 (or communicating with a server coupled to the base station 1100), and to provide location data and/or assistance data to such multiple wireless devices.

The methodologies described herein may be implemented by various means depending upon the application. For example, these methodologies may be implemented in hardware, firmware, software, or any combination thereof. For a hardware implementation, the one or more processors may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For an implementation involving firmware and/or software, the methodologies may be implemented with modules (e.g., procedures, functions, and so on) that perform the separate functions described herein. Any machine-readable medium tangibly embodying instructions may be used in implementing the methodologies described herein. For example, software codes may be stored in a memory and executed by one or more processor units, causing the processor units to operate as a special purpose computer programmed to perform the algorithms disclosed herein. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a non-transitory computer-readable storage medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer-readable storage medium, instructions and/or data may be provided as signals on transmission media included in a communication apparatus. For example, a communication apparatus may include a transceiver having signals indicative of instructions and data. The instructions and data are stored on non-transitory computer readable media, e.g., memory 1140, and are configured to cause the one or more processors to operate as a special purpose computer programmed to perform the procedures and techniques disclosed herein. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

Figure 12:
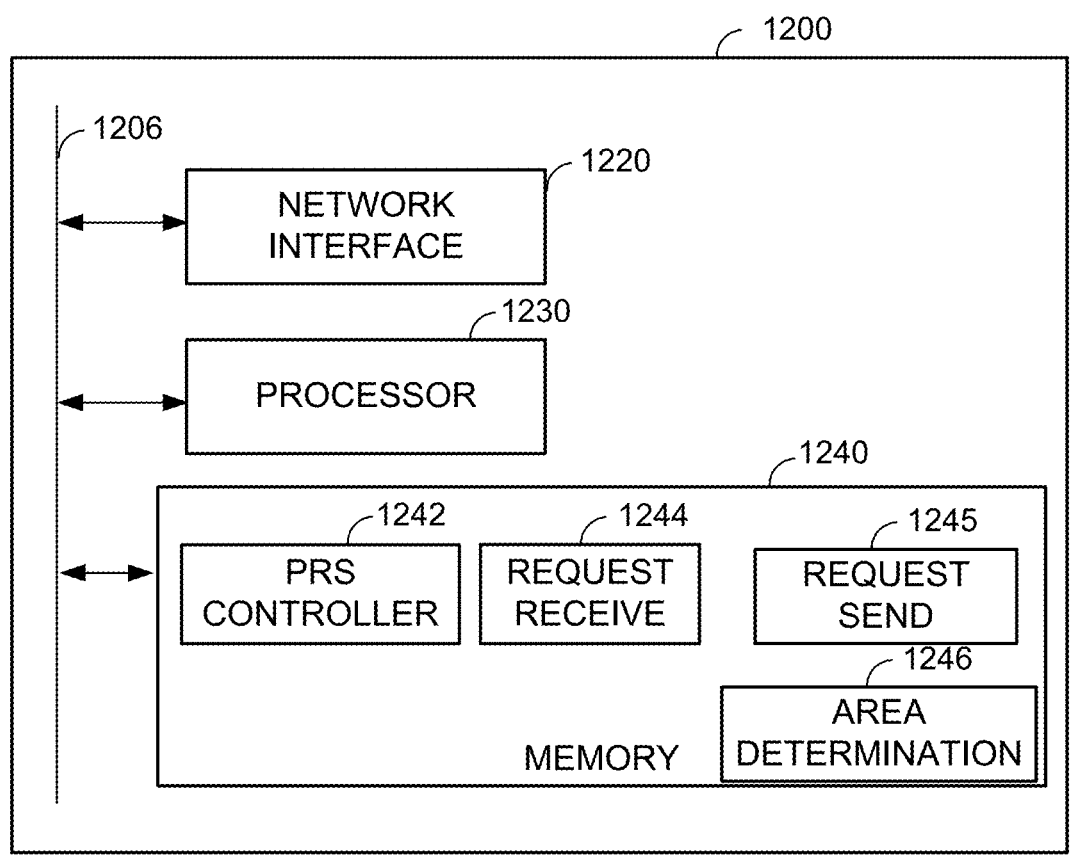
FIG. 12 is a block diagram of an embodiment of a server capable of controlling PRS transmissions.

FIG. 12 shows a schematic diagram of a hardware implementation of a server 1200, such as a LMF 120 or LMC 117, which may be similar to, and be configured to have a functionality similar to that depicted or described, for example, with reference to FIGS. 1A-1B, 2, 3, and 7. The server 1200 may include a network interface 1220 a network interface 1220 to communicate with other network nodes (e.g., sending and receiving queries and responses), e.g., to base stations and the UE. For example, each network element may be configured to communicate (e.g., via wired or wireless backhaul communication) with a gateway, or other suitable device of a network, to facilitate communication with one or more core network nodes (e.g., any of the other nodes and elements shown in FIGS. 1A-1B).

The server 1200 may include, in some embodiments, at least one processor 1230 (also referred to as a controller) and memory 1240 to manage communications with other nodes (e.g., sending and receiving messages), to generate communication signals (including to generate communication frames, signals and/or messages with adjustable quantities of resources that are allocated for location-related information such as PRS transmissions and assistance data transmissions), and to provide other related functionality, including functionality to implement the various processes and methods described herein. The one or more processors 1230 and memory 1240 may be coupled together with bus 1206. The one or more processors 1230 and other components of the server 1200 may similarly be coupled together with bus 1206, a separate bus, or may be directly connected together or coupled using a combination of the foregoing. The memory 1240 may contain executable code or software instructions that when executed by the one or more processors 1230 cause the one or more processors 1230 to operate as a special purpose computer programmed to perform the procedures and techniques disclosed herein (e.g. such as the process flows 1000).

As illustrated in FIG. 12, the memory 1240 includes one or more components or modules that when implemented by the one or more processors 1230 implements the methodologies as described herein. While the components or modules are illustrated as software in memory 1240 that is executable by the one or more processors 1230, it should be understood that the components or modules may be dedicated hardware either in the processor or off processor. As illustrated, the memory 1240 may include a PRS controller 1242 that enables the one or more processors 1230 to determine an increase in transmission of PRS at each of a plurality of transmitters. The PRS controller 1242, for example, coordinates to avoid interference to or from non-PRS transmission in the wireless network. The PRS controller 1242, for example, may enable the one or more processors 1230 to send messages to each transmitter, e.g., via network interface 1220, indicating the increase in transmission of PRS for the each transmitter, and to enable the one or more processors 1230 to receive, via network interface 1220, a response from the each transmitter confirming or rejecting the increase in transmission of PRS at the each transmitter. The memory 1240 may include a request receive module 1244 that enables the one or more processors 1230 to receive, via network interface 1220, requests for increased PRS from UEs or requests in a notification report from base stations, wherein the increase in transmission of PRS is based on the received requests. The memory 1240 may further include a request send module 1245, which enables the one or more processors 1230 to send, via network interface 1220, messages to UEs requesting measurements of at least one PRS with increased transmission from at least one transmitter. The memory 1240 may further include an area determination module 1246, which enables the one or more processors 1230 to determine an area of increased PRS transmission to avoid interference to or from non-PRS transmission in the wireless network.

The methodologies described herein may be implemented by various means depending upon the application. For example, these methodologies may be implemented in hardware, firmware, software, or any combination thereof. For a hardware implementation, the one or more processors may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For an implementation involving firmware and/or software, the methodologies may be implemented with modules (e.g., procedures, functions, and so on) that perform the separate functions described herein. Any machine-readable medium tangibly embodying instructions may be used in implementing the methodologies described herein. For example, software codes may be stored in a memory and executed by one or more processor units, causing the processor units to operate as a special purpose computer programmed to perform the algorithms disclosed herein. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a non-transitory computer-readable storage medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer-readable storage medium, instructions and/or data may be provided as signals on transmission media included in a communication apparatus. For example, a communication apparatus may include a transceiver having signals indicative of instructions and data. The instructions and data are stored on non-transitory computer readable media, e.g., memory 1240, and are configured to cause the one or more processors to operate as a special purpose computer programmed to perform the procedures and techniques disclosed herein. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

Thus, an entity in a wireless network, such as the base station 1100 or server 1200 may be configured for supporting location of a user equipment (UE) and may include a means for determining an increase in transmission of a positioning reference signal (PRS) at each of a plurality of transmitters, wherein the increase in transmission of PRS at each of the plurality of transmitters is coordinated to avoid interference to or from non-PRS transmission in the wireless network, which may be, e.g., one or more of the communication modules 1110*a-n*, and one or more processors 1130 with dedicated hardware or implementing executable code or software instructions in memory 1140 such as the PRS controller 1142, or the network interface 1220 and one or more processors 1230 with dedicated hardware or implementing executable code or software instructions in memory 1240 such as the PRS controller 1242. A means for sending a first message to the each transmitter, the first message comprising an indication of the increase in transmission of PRS for the each transmitter may be, e.g., the one or more of the communication modules 1110*a-n* and one or more processors 1130 with dedicated hardware or implementing executable code or software instructions in memory 1140 such as the PRS controller 1142, or the network interface 1220 and one or more processors 1230 with dedicated hardware or implementing executable code or software instructions in memory 1240 such as the PRS controller 1242. A means for receiving a response from the each transmitter, the response confirming or rejecting the increase in transmission of PRS at the each transmitter, may be, e.g., the one or more of the communication modules 1110*a-n* and one or more processors 1130 with dedicated hardware or implementing executable code or software instructions in memory 1140 such as the PRS controller 1142, or the network interface 1220 and one or more processors 1230 with dedicated hardware or implementing executable code or software instructions in memory 1240 such as the PRS controller 1242.

In one implementation, the entity may include a means for receiving location requests for a plurality of one or more UEs, wherein the determining an increase in transmission of a PRS at each of the plurality of transmitters is based on the location requests, which may be, e.g., the one or more of the communication modules 1110*a-n* and one or more processors 1130 with dedicated hardware or implementing executable code or software instructions in memory 1140 such as the request receive module 1144. A means for sending a second message to each UE in the plurality of one or more UEs, the second message requesting measurements by the each UE of at least one PRS with increased transmission from at least one transmitter may be, e.g., the one or more of the communication modules 1110*a-n* and one or more processors 1130 with dedicated hardware or implementing executable code or software instructions in memory 1140 such as the request send module 1145.

In one implementation, the entity may include a means for receiving notification reports from a plurality of base stations, the notification report from each base station in the plurality of base station requesting an increase in PRS transmission for the each base station, wherein determining an increase in transmission of a positioning reference signal (PRS) at each of the plurality of transmitters is based on the notification report, wherein the plurality of base stations comprise or are a subset of the plurality of transmitters, which may be, e.g., the one or more of the communication modules 1110*a-n* and one or more processors 1130 with dedicated hardware or implementing executable code or software instructions in memory 1140 such as the request receive module 1144.

In one implementation, the entity may include a means for receiving requests for increased PRS from a plurality of one or more UEs, wherein determining an increase in transmission of a positioning reference signal (PRS) at each of the plurality of transmitters is based on the requests for increased PRS, wherein the plurality of TPs comprises or includes the base station, which may be, e.g., the network interface 1220 and one or more processors 1230 with dedicated hardware or implementing executable code or software instructions in memory 1240 such as the request receive module 1244.

In one implementation, the entity may include a means for receiving requests for location of a plurality of one or more UEs, wherein determining an increase in transmission of a positioning reference signal (PRS) at each of the plurality of transmitters is based on the requests for location, wherein the plurality of TPs comprises or includes the base station which may be, e.g., the network interface 1220 and one or more processors 1230 with dedicated hardware or implementing executable code or software instructions in memory 1240 such as the request receive module 1244. The entity may further include a means for sending a second message to each UE in the plurality of one or more UEs, the second message requesting measurements by the each UE of at least one PRS with increased transmission from at least one TP, which may be, e.g., the network interface 1220 and one or more processors 1230 with dedicated hardware or implementing executable code or software instructions in memory 1240 such as the request send module 1245.

In one implementation, the coordination to avoid interference to or from non-PRS transmission in the wireless network may be a means for determining an area of increased PRS transmission, wherein the increase in transmission of PRS at each of the plurality of transmitters comprises an increase in transmission of a plurality of directional PRSs at each of the plurality of TPs, wherein the plurality of directional PRSs comprise PRS beams directed inside the area and exclude PRS beams directed outside the area, which may be, e.g., the one or more processors 1130 with dedicated hardware or implementing executable code or software instructions in memory 1140 such as the area determination module 1146, or the one or more processors 1230 with dedicated hardware or implementing executable code or software instructions in memory 1240 such as the area determination module 1246.

Figure 13:
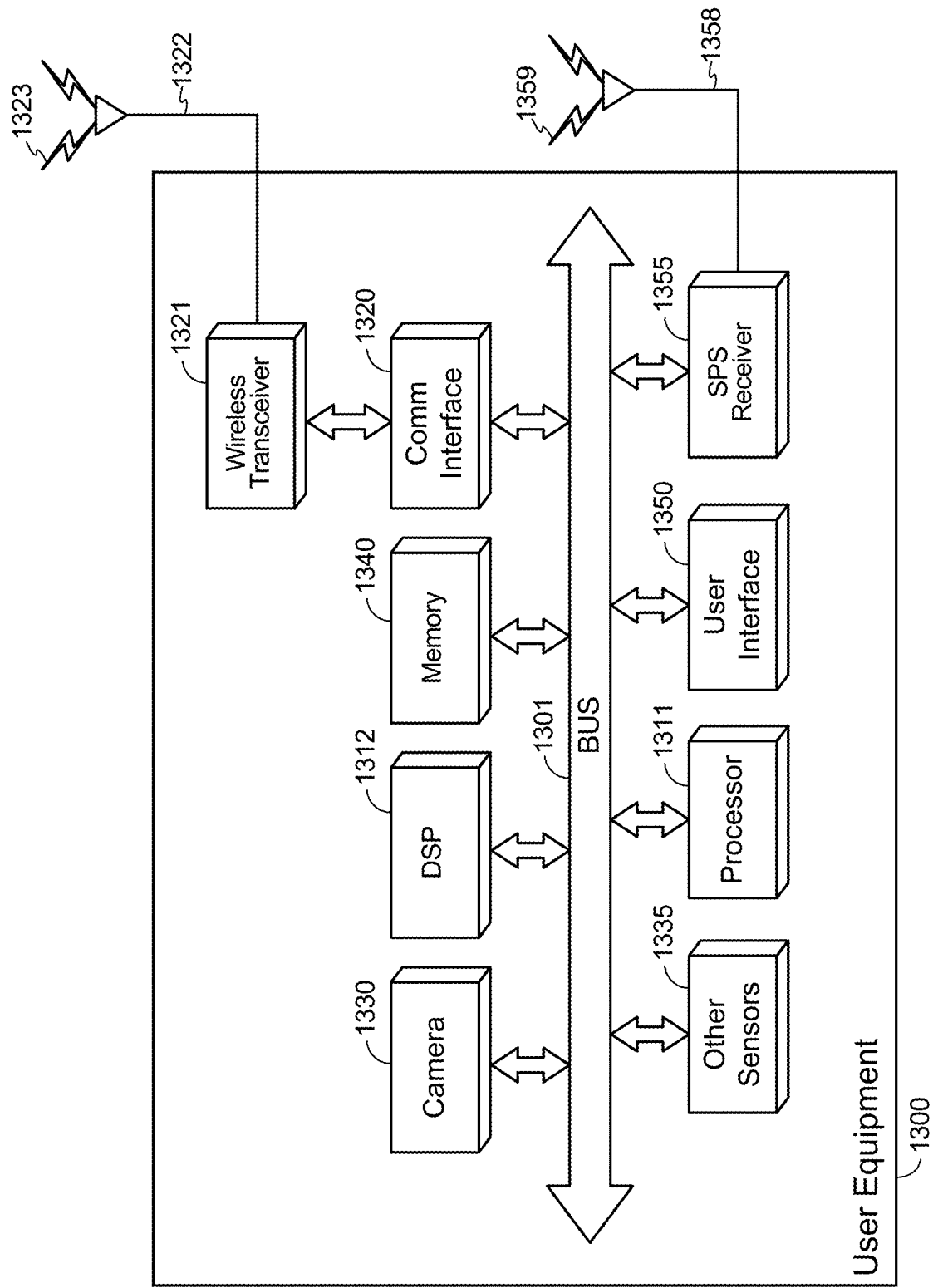
FIG. 13 is a block diagram of an embodiment of a user equipment (UE) capable of receiving controlled PRS transmissions.

FIG. 13 shows a user equipment (UE) 1300 for which various procedures and techniques described herein can be utilized. The UE 1300 may be similar or identical, in implementation and/or functionality, to any of the other UEs described herein, including the UE 105 depicted in FIGS. 1A-1B, 2, 3, and 7. Furthermore, the implementation illustrated in FIG. 13 may also be used to implement, at least in part, some of the nodes and devices illustrated throughout the present disclosure, including such nodes and devices and the base stations (e.g. gNBs 110, ng-eNB 114, etc.), location servers, and other components and devices illustrated in FIGS. 1A-1B, 2, 3, and 7.

The UE 1300 includes a processor 1311 (or processor core) and memory 1340. As described herein, the UE 1300 is configured to, for example request an increased quantity of location-related information to be provided (e.g., broadcast) by a serving wireless node, and/or by other wireless nodes (as may be determined by the UE 1300 or by the wireless node to which it sends the request). The UE 1300 is further configured to receive and utilize (e.g., for positioning functionality) the requested increased quantity of location-related information. The UE 1300 may optionally include a trusted environment operably connected to the memory 1340 by a public bus 1301 or a private bus (not shown). The UE 1300 may also include a communication interface 1320 and a wireless transceiver 1321 configured to send and receive wireless signals 1323 (which may include LTE, NR, 5G or WiFi wireless signals) via a wireless antenna 1322 over a wireless network (such as the communication system 100 of FIG. 1A). The wireless transceiver 1321 is connected to the bus 1301 via the communication interface 1320. Here, the UE 1300 is illustrated as having a single wireless transceiver 1321. However, the UE 1300 can alternatively have multiple wireless transceivers 1321 and/or multiple wireless antennas 1322 to support multiple communication standards such as WiFi, CDMA, Wideband CDMA (WCDMA), Long Term Evolution (LTE), 5G, NR, Bluetooth® short-range wireless communication technology, etc.

The communication interface 1320 and/or wireless transceiver 1321 may support operations on multiple carriers (waveform signals of different frequencies). Multi-carrier transmitters can transmit modulated signals simultaneously on the multiple carriers. Each modulated signal may be a Code Division Multiple Access (CDMA) signal, a Time Division Multiple Access (TDMA) signal, an Orthogonal Frequency Division Multiple Access (OFDMA) signal, a Single-Carrier Frequency Division Multiple Access (SC-FDMA) signal, etc. Each modulated signal may be sent on a different carrier and may carry pilot, control information, overhead information, data, etc.

The UE 1300 may also include a user interface 1350 (e.g., display, graphical user interface (GUI), touchscreen, keyboard, microphone, speaker), and a Satellite Positioning System (SPS) receiver 1355 that receives SPS signals 1359 (e.g., from SPS satellites) via an SPS antenna 1358 (which may be the same antenna as wireless antenna 1322, or may be different). The SPS receiver 1355 can communicate with a single global navigation satellite system (GNSS) or multiple such systems. A GNSS can include, but is not limited to, Global Positioning System (GPS), Galileo, Glonass, Beidou (Compass), etc. SPS satellites are also referred to as satellites, space vehicles (SVs), etc. The SPS receiver 1355 measures the SPS signals 1359 and may use the measurements of the SPS signals 1359 to determine the location of the UE 1300. The processor 1311, memory 1340, Digital Signal Processor (DSP) 1312 and/or specialized processor(s) (not shown) may also be utilized to process the SPS signals 1359, in whole or in part, and/or to compute (approximately or more precisely) the location of the UE 1300, in conjunction with SPS receiver 1355. Alternatively, the UE 1300 may support transfer of the SPS measurements to a location server (e.g., E-SMLC, an LMF, such as the LMF 120 of FIG. 1A, etc.) that computes the UE location instead. Storage of information from the SPS signals 1359 or other location signals is performed using a memory 1340 or registers (not shown). While only one processor 1311, one DSP 1312 and one memory 1340 are shown in FIG. 13, more than one of any, a pair, or all of these components could be used by the UE 1300. The processor 1311 and the DSP 1312 associated with the UE 1300 are connected to the bus 1301.

The memory 1340 can include a non-transitory computer-readable storage medium (or media) that stores functions as one or more instructions or code. Media that can make up the memory 1340 include, but are not limited to, RAM, ROM, FLASH, disc drives, etc. In general, the functions stored by the memory 1340 are executed by general-purpose processor(s), such as the processor 1311, specialized processors, such as the DSP 1312, etc. Thus, the memory 1340 is a processor-readable memory and/or a computer-readable memory that stores software (programming code, instructions, etc.) configured to cause the processor(s) 1311 and/or DSP(s) 1312 to perform the functions described (e.g. the functions described previously for the example procedure 700 of FIG. 7). Alternatively, one or more functions of the UE 1300 may be performed in whole or in part in hardware.

A UE 1300 can estimate its current position within an associated system using various techniques, based on other communication entities within radio range and/or information available to the UE 1300. For instance, the UE 1300 can estimate its position using information obtained from: base stations and access points (APs) associated with one or more wireless wide area networks (WWANs), wireless local area networks (WLANs), personal area networks (PANs) utilizing a short-range wireless communication technology such as Bluetooth® wireless technology or ZIGBEE®, etc.; Global Navigation Satellite System (GNSS) or other Satellite Positioning System (SPS) satellites; and/or map data obtained from a map server or other server (e.g., an LMF, an E-SMLC or SLP). In some cases, a location server, which may be an E-SMLC, SLP, Standalone Serving Mobile Location Center (SAS), an LMF, etc., may provide assistance data to the UE 1300 to allow or assist the UE 1300 to acquire signals (e.g., signals from WWAN base stations, signals from WLAN APs, signals from cellular base stations, GNSS satellites, etc.) and make location-related measurements using these signals. The UE 1300 may then provide the measurements to the location server to compute a location estimate (which may be known as "UE assisted" positioning) or may compute a location estimate itself (which may be known as "UE based" positioning) based on the measurements and possibly based also on other assistance data provided by the location server (e.g. such as orbital and timing data for GNSS satellites, configuration parameters for the PRS signals, the precise location coordinates of WLAN APs and/or cellular base stations, etc.)

In some embodiments, the UE 1300 may include a camera 1330 (e.g., front and/or back facing) such as, for example, complementary metal-oxide-semiconductor (CMOS) image sensors with appropriate lens configurations. Other imaging technologies such as charge-coupled devices (CCD) and back side illuminated CMOS may be used. The camera 1330 may be configured to obtain and provide image information to assist in positioning of the UE 1300. In an example, one or more external image processing servers (e.g., remote servers) may be used to perform image recognition and provide location estimation processes. The UE 1300 may include other sensors 1335 which may also be used to compute, or used to assist in computing, a location for the UE 1300. The sensors 1335 may include inertial sensors (e.g., accelerometers, gyroscopes, magnetometers, a compass, any of which may be implemented based on micro-electro-mechanical-system (MEMS), or based on some other technology), as well as a barometer, thermometer, hygrometer and other sensors.

As noted, in some embodiments the UE may be configured to request and receive (e.g., via the wireless transceiver 1321), communication signals (e.g. broadcast subframes) that are controlled/configured to increase the quantity of location-related information. For example, the increased quantity of location-related information may be achieved by increasing (at the wireless nodes communicating with the UE) the bandwidth of PRS, increasing the frequency and/or duration of PRS positioning occasions, increasing the quantity of assistance data, increasing the frequency of transmitting assistance data, transmitting PRS using an uplink carrier frequency, etc.

Substantial variations may be made in accordance with specific desires. For example, customized hardware might also be used, and/or particular elements might be implemented in hardware, software (including portable software, such as applets, etc.), or both. Further, connection to other computing devices such as network input/output devices may be employed.

Configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Unless defined otherwise, all technical and scientific terms used herein have the same meaning as commonly or conventionally understood. As used herein, the articles "a" and "an" refer to one or to more than one (i.e., to at least one) of the grammatical object of the article. By way of example, "an element" means one element or more than one element. "About" and/or "approximately" as used herein when referring to a measurable value such as an amount, a temporal duration, and the like, encompasses variations of ±20% or ±10%, ±5%, or +0.1% from the specified value, as such variations are appropriate in the context of the systems, devices, circuits, methods, and other implementations described herein. "Substantially" as used herein when referring to a measurable value such as an amount, a temporal duration, a physical attribute (such as frequency), and the like, also encompasses variations of ±20% or ±10%, ±5%, or +0.1% from the specified value, as such variations are appropriate in the context of the systems, devices, circuits, methods, and other implementations described herein.

As used herein, including in the claims, "or" as used in a list of items prefaced by "at least one of" or "one or more of" indicates a disjunctive list such that, for example, a list of "at least one of A, B, or C" means A or B or C or AB or AC or BC or ABC (i.e., A and B and C), or combinations with more than one feature (e.g., AA, AAB, ABBC, etc.). Also, as used herein, unless otherwise stated, a statement that a function or operation is "based on" an item or condition means that the function or operation is based on the stated item or condition and may be based on one or more items and/or conditions in addition to the stated item or condition.

As used herein, a mobile device, user equipment (UE), or mobile station (MS) refers to a device such as a cellular or other wireless communication device, a smartphone, tablet, personal communication system (PCS) device, personal navigation device (PND), Personal Information Manager (PIM), Personal Digital Assistant (PDA), laptop or other suitable mobile device which is capable of receiving wireless communication and/or navigation signals, such as navigation positioning signals. The term "mobile station" (or "mobile device". "wireless device" or "user equipment") is also intended to include devices which communicate with a personal navigation device (PND), such as by short-range wireless, infrared, wireline connection, or other connection—regardless of whether satellite signal reception, assistance data reception, and/or position-related processing occurs at the device or at the PND. Also, a "mobile station" or "user equipment" is intended to include all devices, including wireless communication devices, computers, laptops, tablet devices, etc., which are capable of communication with a server, such as via the Internet, WiFi, or other network, and to communicate with one or more types of nodes, regardless of whether satellite signal reception, assistance data reception, and/or position-related processing occurs at the device, at a server, or at another device or node associated with the network. Any operable combination of the above are also considered a "mobile station" or "user equipment." A mobile device or user equipment (UE) may also be referred to as a mobile terminal, a terminal, a device, a Secure User Plane Location Enabled Terminal (SET), a target device, a target, or by some other name.

In an embodiment, a first example independent claim may include a method for supporting location of a user equipment (UE) at a first wireless node, comprising receiving a first request for broadcast of an increased quantity of location-related information, the broadcast based on a wireless access type for the first wireless node; and broadcasting the increased quantity of location-related information using the wireless access type and based on the first request.

Example dependent claims may include one or more of the following features. The wireless access type is Fifth Generation (5G), New Radio (NR) or Long Term Evolution (LTE). The location-related information comprises a Positioning Reference Signal (PRS). The increased quantity of location-related information comprises an increased PRS bandwidth, an increased frequency of PRS positioning occasions, an increased duration for a PRS positioning occasion, an increased number of separate PRS signals, a transmission of PRS using an uplink carrier frequency, or some combination thereof. The method may further include sending a second request for a muting of transmission to a second wireless node for the wireless access type, wherein the muting of transmission is based on avoiding radio interference with the broadcast of the increased quantity of location-related information by the first wireless node. The location-related information may comprise location assistance data. The location assistance data may comprise assistance data for Observed Time Difference Of Arrival (OTDOA), assistance data for Assisted Global Navigation Satellite System (A-GNSS), assistance data for Real Time Kinematics (RTK), assistance data for Precise Point Positioning (PPP), assistance data for Differential GNSS (DGNSS), or any combination thereof. The increased quantity of location-related information may comprise an increased quantity of location assistance data, additional types of location assistance data, an increased frequency of broadcasting location assistance data, an increased repetition of the broadcasting of the location assistance data, or any combination thereof. The first request may be received from a third wireless node. The first request may be received from the UE. The first request may be received using a Radio Resource Control (RRC) protocol for the wireless access type. The first wireless node may be a serving wireless node for the UE based on the wireless access type. The method may further include sending a third request for the broadcast of an increased quantity of location-related information to a fourth wireless node for the wireless access type, wherein the third request is based on the first request. The method may further include sending a response to the UE, wherein the response comprises a confirmation of the broadcasting of the increased quantity of location-related information by the first wireless node. The method may further include receiving a fourth request from the UE for a termination of the broadcast of the increased quantity of location-related information, and terminating the broadcasting of the increased quantity of location-related information using the wireless access type based on the fourth request.

While some of the techniques, processes, and/or implementations presented herein may comply with all or part of one or more standards, such techniques, processes, and/or implementations may not, in some embodiments, comply with part or all of such one or more standards.

Although particular embodiments have been disclosed herein in detail, this has been done by way of example for purposes of illustration only, and is not intended to be limiting with respect to the scope of the appended claims, which follow. In particular, it is contemplated that various substitutions, alterations, and modifications may be made without departing from the spirit and scope of the invention as defined by the claims. Other aspects, advantages, and modifications are considered to be within the scope of the following claims. The claims presented are representative of the embodiments and features disclosed herein. Other unclaimed embodiments and features are also contemplated. Accordingly, other embodiments are within the scope of the following claims.

What is claimed is:

1. A method at a user equipment (UE) in a wireless network for determining a location of the UE, the method comprising:
    receiving a first message requesting the location of the UE;
    subsequent to receiving the first message, sending, to a network entity, a second message requesting an increase in transmission of a positioning reference signal (PRS) at each of a plurality of transmitters;
    receiving, from the network entity and subsequent to sending the second message, a PRS configuration indicative of the increase in transmission of the PRS at each of the plurality of transmitters, wherein the increase in transmission of the PRS at each of the plurality of transmitters comprises an increase in transmission by each transmitter of PRS inside an area in which the UE is located and excludes an increase in transmission by each transmitter of PRS directed outside the area; and
    performing a measurement of at least one PRS with increased transmission from at least one transmitter of the plurality of transmitters, wherein the measurement is performed in accordance with the PRS configuration.

2. The method of claim 1, further comprising determining the location of the UE based at least in part on the measurement.

3. The method of claim 2, wherein the first message is received from a requesting entity comprising a Location Management Function (LMF), a Location Management Component (LMC), or a base station; and wherein the method further comprises sending information indicative of the determined location of the UE to the requesting entity.

4. The method of claim 2, wherein the first message is received from a client internal to the UE, and wherein the method further comprises providing information indicative of the determined location of the UE to the client.

5. The method of claim 1, wherein the first message is received from a requesting entity comprising an LMF, an LMC, or a base station; and wherein the method further comprises sending information indicative of the measurement to the requesting entity.

6. The method of claim 1, wherein the network entity comprises an LMF, an LMC, or a base station.

7. The method of claim 1, wherein sending the second message is responsive to a determination to request the increase in transmission of the PRS.

8. The method of claim 7, wherein the determination to request the increase in transmission of the PRS is based on one or more quality of service (QoS) requirements related to the requesting of the location of the UE.

9. The method of claim 1, wherein the second message comprises a request for a random access procedure, a Radio Resource Control (RRC) message, or both.

10. The method of claim 1, wherein the second message comprises a PRS capability of the UE, a parameter for the PRS configuration, a preferred number of base stations to which the increase in transmission of the PRS applies, or any combination thereof.

11. The method of claim 10, wherein the parameter for the PRS configuration includes a preferred PRS bandwidth, a preferred duration of PRS positioning occasions, a preferred PRS beam direction for a particular base station, or any combination thereof.

12. The method of claim 10, wherein the PRS capability of the UE is indicated in the second message with a bit map or integer.

13. The method of claim 1, wherein the plurality of transmitters comprises a plurality of base stations, a plurality of PRS only beacons, a plurality of remote radio heads, a plurality of Transmission Points (TPs), a plurality of Transmission Reception Points (TRPs), or any combination thereof.

14. A user equipment (UE) for determining a location of the UE, the UE comprising:
- a transceiver;
- a memory; and
- one or more processors communicatively coupled with the transceiver and the memory, wherein the one or more processors are configured to:
  - receive a first message requesting the location of the UE;
  - subsequent to receiving the first message, sending, to a network entity, a second message requesting an increase in transmission of a positioning reference signal (PRS) at each of a plurality of transmitters;
  - receive, via the transceiver from the network entity and subsequent to sending the second message, a PRS configuration indicative of the increase in transmission of the PRS at each of the plurality of transmitters, wherein the increase in transmission of the PRS at each of the plurality of transmitters comprises an increase in transmission by each transmitter of PRS inside an area in which the UE is located and excludes an increase in transmission by each transmitter of PRS directed outside the area; and
  - perform a measurement of at least one PRS with increased transmission from at least one transmitter of the plurality of transmitters, wherein the measurement is performed in accordance with the PRS configuration.

15. The UE of claim 14, wherein the one or more processors are further configured to determine the location of the UE based at least in part on the measurement.

16. The UE of claim 15, wherein the one or more processors are configured to receive the first message from a requesting entity comprising a Location Management Function (LMF), a Location Management Component (LMC), or a base station; and wherein the one or more processors are further configured to send information indicative of the determined location of the UE via the transceiver to the requesting entity.

17. The UE of claim 15, wherein the one or more processors are configured to receive the first message from a client internal to the UE, and wherein the one or more processors are further configured to provide information indicative of the determined location of the UE to the client.

18. The UE of claim 14, wherein the one or more processors are configured to receive the first message from a requesting entity comprising an LMF, an LMC, or a base station; and wherein the one or more processors are further configured to send information indicative of the measurement to the requesting entity.

19. The UE of claim 14, wherein the one or more processors are configured to send the second message responsive to a determination to request the increase in transmission of the PRS.

20. The UE of claim 19, wherein the one or more processors are configured to perform the determination to request the increase in transmission of the PRS based on one or more quality of service (QoS) requirements related to the requesting of the location of the UE.

21. The UE of claim 14, wherein the one or more processors are configured to send the second message in a request for a random access procedure, a Radio Resource Control (RRC) message, or both.

22. The UE of claim 14, wherein the one or more processors are configured to include, in the second message, a PRS capability of the UE, a parameter for the PRS configuration, a preferred number of base stations to which the increase in transmission of the PRS applies, or any combination thereof.

23. The UE of claim 22, wherein the one or more processors are configured to include, in the parameter for the PRS configuration, a preferred PRS bandwidth, a preferred duration of PRS positioning occasions, a preferred PRS beam direction for a particular base station, or any combination thereof.

24. The UE of claim 22, wherein the one or more processors are configured to indicate the PRS capability of the UE in the second message with a bit map or integer.

25. The UE of claim 14, wherein the plurality of transmitters comprises a plurality of base stations, a plurality of PRS only beacons, a plurality of remote radio heads, a plurality of Transmission Points (TPs), a plurality of Transmission Reception Points (TRPs), or any combination thereof.

26. An apparatus for determining a location of a user equipment (UE), the apparatus comprising:
- means for receiving a first message requesting the location of the UE;
- means for sending, to a network entity and subsequent to receiving the first message, a second message requesting an increase in transmission of a positioning reference signal (PRS) at each of a plurality of transmitters;
- means for receiving, from the network entity and subsequent to sending the second message, a PRS configuration indicative of the increase in transmission of the PRS at each of the plurality of transmitters, wherein the increase in transmission of the PRS at each of the plurality of transmitters comprises an increase in transmission by each transmitter of PRS inside an area in which the UE is located and excludes an increase in transmission by each transmitter of PRS directed outside the area; and
- means for performing a measurement of at least one PRS with increased transmission from at least one transmitter of the plurality of transmitters, wherein the measurement is performed in accordance with the PRS configuration.

27. The apparatus of claim 26, further comprising means for determining the location of the UE based at least in part on the measurement.

28. The apparatus of claim 26, wherein means for receiving the first message comprise means for receiving the first message from a requesting entity comprising an LMF, an LMC, or a base station; and wherein the apparatus further comprises means for sending information indicative of the measurement to the requesting entity.

29. The apparatus of claim 26, wherein the means for sending the second message to the network entity comprises means for sending the second message to an LMF, an LMC, or a base station.

30. A non-transitory computer-readable medium storing instructions for determining a location of a user equipment (UE), the instructions comprising code for:

receiving a first message requesting the location of the UE;

subsequent to receiving the first message, sending, to a network entity, a second message requesting an increase in transmission of a positioning reference signal (PRS) at each of a plurality of transmitters;

receiving, from the network entity and subsequent to sending the second message, a PRS configuration indicative of the increase in transmission of the PRS at each of the plurality of transmitters, wherein the increase in transmission of the PRS at each of the plurality of transmitters comprises an increase in transmission by each transmitter of PRS inside an area in which the UE is located and excludes an increase in transmission by each transmitter of PRS directed outside the area; and performing a measurement of at least one PRS with increased transmission from at least one transmitter of the plurality of transmitters, wherein the measurement is performed in accordance with the PRS configuration.

* * * * *